(12) United States Patent
Gysling et al.

(10) Patent No.: US 6,813,962 B2
(45) Date of Patent: Nov. 9, 2004

(54) DISTRIBUTED SOUND SPEED MEASUREMENTS FOR MULTIPHASE FLOW MEASUREMENT

(75) Inventors: Daniel L. Gysling, Glastonbury, CT (US); Mark R. Myers, Storrs, CT (US)

(73) Assignee: Weatherford/Lamb, Inc., Houston, TX (US)

( * ) Notice: Subject to any disclaimer, the term of this patent is extended or adjusted under 35 U.S.C. 154(b) by 96 days.

(21) Appl. No.: 10/256,760

(22) Filed: Sep. 27, 2002

(65) Prior Publication Data

US 2003/0066359 A1 Apr. 10, 2003

Related U.S. Application Data

(63) Continuation-in-part of application No. 09/519,785, filed on Mar. 7, 2000, now Pat. No. 6,601,458.

(51) Int. Cl.$^7$ ............................................... G01F 1/66
(52) U.S. Cl. ................................................... 73/861.26
(58) Field of Search ....................... 73/861.18, 861.23, 73/861.26, 861.28

(56) References Cited

U.S. PATENT DOCUMENTS

| | | |
|---|---|---|
| 3,149,492 A | 9/1964 | Weinberg |
| 3,851,521 A | 12/1974 | Ottenstein |
| 4,080,837 A | 3/1978 | Alexander |
| 4,114,439 A | 9/1978 | Fick |
| 4,144,768 A | 3/1979 | Andersson |
| 4,159,646 A | 7/1979 | Paulsen |
| 4,164,865 A | 8/1979 | Hall |
| 4,236,406 A | 12/1980 | Reed |
| 4,275,602 A | 6/1981 | Fujishiro |
| 4,445,389 A | 5/1984 | Potzick |
| 4,499,418 A | 2/1985 | Helms |
| 4,515,473 A | 5/1985 | Mermelstein |

(List continued on next page.)

FOREIGN PATENT DOCUMENTS

| | | |
|---|---|---|
| DE | 19511234 | 12/1975 |
| EP | 0684458 | 5/1995 |
| FR | 2 357 868 | 7/1976 |
| JP | 406082281 | 9/1992 |
| WO | WO 93/14382 | 7/1993 |
| WO | WO 96/04528 | 2/1996 |
| WO | WO 00/00793 | 1/2000 |

OTHER PUBLICATIONS

Mesch, F. (1990) "Speed and Flow Measurement by an Intelligent Correlation System," Advances in Instrumentation and Control, Research Triangle Park, NC, part 4, p. 1899–1914.

Specification for U.S. Patent Application Ser. No. 09/344,069, filed Jun. 25, 1999, Attorney Docket: WEAF:106.

(List continued on next page.)

*Primary Examiner*—Max Noori
(74) *Attorney, Agent, or Firm*—Moser, Patterson & Sheridan, L.L.P.

(57) ABSTRACT

A multiphase flow meter distributed system is disclosed that is capable of measuring phase flow rates of a multiphase fluid. The distributed system includes at least one flow meter disposed along the pipe, an additional sensor disposed along the pipe spatially removed from the flow meter, and a multiphase flow model that receives flow related parameters from the flow meter and the additional sensor to calculate the phase flow rates. The flow meter provides parameters such as pressure, temperature, fluid sound speed and/or velocity of the fluid, and the additional sensor provides a parameter indicative of pressure and or temperature of the fluid. Depending on production needs and the reservoir dimensions, the distributed system may utilize a plurality of flow meters disposed at several locations along the pipe and may further include a plurality of additional sensors as well. The distributed system preferably uses fiber optic sensors with bragg gratings. This enables the system to have a high tolerance for long term exposure to harsh temperature environments and also provides the advantage of multiplexing the flow meters and/or sensors together.

87 Claims, 25 Drawing Sheets

U.S. PATENT DOCUMENTS

| | | |
|---|---|---|
| 4,520,320 A | 5/1985 | Potzick |
| 4,546,649 A | 10/1985 | Kantor |
| 4,706,501 A | 11/1987 | Atkinson |
| 4,788,852 A | 12/1988 | Martin |
| 4,813,270 A | 3/1989 | Baillie |
| 4,862,750 A | 9/1989 | Nice |
| 4,864,868 A | 9/1989 | Khalifa |
| 4,884,457 A | 12/1989 | Hatton |
| 4,896,540 A | 1/1990 | Shakkottai |
| 4,932,262 A | 6/1990 | Wlodarczyk |
| 4,944,186 A | 7/1990 | Dorr ........................... 73/597 |
| 4,947,127 A | 8/1990 | Helms |
| 4,950,883 A | 8/1990 | Glenn |
| 4,976,151 A | 12/1990 | Morishita |
| 4,996,419 A | 2/1991 | Morey |
| 5,024,099 A | 6/1991 | Lee |
| 5,031,460 A | 7/1991 | Kanenobu |
| 5,040,415 A * | 8/1991 | Barkhoudarian ............. 73/198 |
| 5,051,922 A | 9/1991 | Toral |
| 5,058,437 A | 10/1991 | Chaumont |
| 5,083,452 A | 1/1992 | Hope |
| 5,099,697 A | 3/1992 | Agar |
| 5,115,670 A | 5/1992 | Shen |
| 5,152,181 A | 10/1992 | Lew |
| 5,207,107 A | 5/1993 | Wolf |
| 5,218,197 A | 6/1993 | Carroll |
| 5,317,576 A | 5/1994 | Leonberger |
| 5,321,991 A | 6/1994 | Kalotay |
| 5,347,873 A | 9/1994 | Vander Heyden |
| 5,361,130 A | 11/1994 | Kersey |
| 5,363,342 A | 11/1994 | Layton |
| 5,367,911 A | 11/1994 | Jewell |
| 5,372,046 A | 12/1994 | Kleven |
| 5,398,542 A | 3/1995 | Vasbinder |
| 5,401,956 A | 3/1995 | Dunphy |
| 5,421,212 A | 6/1995 | Mäyränen et al. ....... 73/861.29 |
| 5,426,297 A | 6/1995 | Dunphy |
| 5,440,932 A | 8/1995 | Wareham |
| 5,493,390 A | 2/1996 | Varasi |
| 5,493,512 A | 2/1996 | Peube |
| 5,513,913 A | 5/1996 | Ball |
| 5,564,832 A | 10/1996 | Ball |
| 5,576,497 A | 11/1996 | Vignos |
| 5,591,922 A | 1/1997 | Segeral |
| 5,597,961 A | 1/1997 | Marrelli |
| 5,639,667 A | 6/1997 | Heslot |
| 5,642,098 A | 6/1997 | Santa Maria |
| 5,644,093 A | 7/1997 | Wright |
| 5,654,551 A | 8/1997 | Watt |
| 5,670,720 A | 9/1997 | Clark |
| 5,680,489 A | 10/1997 | Kersey |
| 5,689,540 A | 11/1997 | Stephenson |
| 5,708,211 A | 1/1998 | Jepson |
| 5,730,219 A | 3/1998 | Tubel |
| 5,732,776 A | 3/1998 | Tubel |
| 5,741,980 A | 4/1998 | Hill |
| 5,803,167 A | 9/1998 | Bussear |
| 5,804,713 A | 9/1998 | Kluth |
| 5,842,347 A | 12/1998 | Kinder |
| 5,845,033 A | 12/1998 | Berthold |
| 5,906,238 A | 5/1999 | Carmody |
| 5,907,104 A | 5/1999 | Cage |
| 5,908,990 A | 6/1999 | Cummings |
| 5,925,821 A | 7/1999 | Bousquet |
| 5,925,879 A | 7/1999 | Hay |
| 5,932,793 A | 8/1999 | Dayton et al. ............... 73/23.2 |
| 5,939,643 A | 8/1999 | Oertel |
| 5,956,132 A | 9/1999 | Donzier |
| 5,959,547 A | 9/1999 | Tubel |
| 5,963,880 A | 10/1999 | Smith |
| 5,975,204 A | 11/1999 | Tubel |
| 5,992,519 A | 11/1999 | Ramakrishnan |
| 5,996,690 A | 12/1999 | Shaw et al. |
| 6,002,985 A | 12/1999 | Stephenson |
| 6,003,383 A | 12/1999 | Zielinska |
| 6,003,385 A | 12/1999 | De Vanssay |
| 6,009,216 A | 12/1999 | Pruett |
| 6,016,702 A | 1/2000 | Maron |
| 6,158,288 A | 12/2000 | Smith |
| 6,216,532 B1 | 4/2001 | Stephenson |
| 6,233,374 B1 | 5/2001 | Ogle |
| 6,279,660 B1 | 8/2001 | Hay |
| 6,286,360 B1 * | 9/2001 | Drzewiecki ................ 73/24.01 |
| 6,354,147 B1 | 3/2002 | Gysling |
| 6,651,514 B2 * | 11/2003 | Zanker .................... 73/861.52 |

OTHER PUBLICATIONS

Gysling, D. (1999) "Development of a Fiber Optic Downhole Multiphase Flow Meter," in *Field Applications& New Technologies for Multiphase Metering*, Multiphase Technology Series Conference, Aberdeen, Scotland.

Beranek, L. and Ver, I. (1992) in "Noise and Vibration Control Engineering, Principles and Application," John Wiley & Sons, Inc., Chapter 14, p:537–541.

Dowling, A. and Williams, J. in "Sound and Sources of Sound," Ellis Horwood Limited, Section 4, p:79–80.

Kersey, A. et al. (1993) "Multiplexed Fiber Bragg Grating Strain–Sensor System with a Fiber Fabry–Perot Wavelength Filter," Optics Letters, 18:1370–1372.

Dandridge, A. & Cogdell, G. (1991) "Fiber Optic Sensors for Navy Applications," IEEE, LCS, 2:81–89.

Nielsen, R. (1991) "Sonar Signal Processing," Artech Huse Inc., Chapter 2, p:51–59.

Krim A. and Viberg M. (1996) "Two Decades of Array Signal Processing Research," IEEE Signal Processing Magazine, p:67–94.

Kersey A. and Darkin, J., Editors (1992) SPIE vol. 1586, "Distributed and Multiplexed Fiber Optic Sensors," p:1–243.

Nerby et al. "A Cost Effective Technique for Production Well Testing," (1995) Offshore Technology Conference, p:505–515.

Velle, O.J. and Nerby, G., "Multiphase Rate Determination Utilizing Multipoint, In–Well Fiber Optic Measurements," Society of Petroleum Engineers, 2001 SPE Annual Technical Conference and Exhibition held in New Orleans, LA. Sep. 30–Oct. 3, 2001.

Kragas, Tor K., Williams, Brock A. and Myers, Gregory A., "The Optic Oil Field: Deployment and Application of Permanent In–Well Fiber Optic Sensing Systems for Production and Resevoir Monitoring," Society of Petroleum Engineers, Inc., 2001 SPE Annual Technical Conference and Exhibit held in New Orleans, LA. Sep. 30–Oct 3, 2001.

Specification for U.S. Patent Application Ser. No. 09/997, 221 filed Nov. 28, 2001, Kersey et al.

Specification for U.S. Patent Application Ser. No. 09/729, 994, filed Dec. 4, 2000, Gysling.

* cited by examiner

DISTRIBUTED SOUND SPEED MEASUREMENTS FOR MULTIPHASE FLOW MEASUREMENT

CROSS REFERENCES TO RELATED APPLICATIONS

This application is a continuation-in-part of U.S. patent application Ser. No. 09/519,785, entitled "Distributed Sound Speed Measurements for Multiphase Flow Measurement," filed Mar. 7, 2000 now U.S. Pat. No. 6,601,458, to which priority is claimed under 35 U.S.C. §120.

This application contains subject matter related to that disclosed in U.S. Pat. No. 6,016,702, entitled "High Sensitivity Fiber Optic Pressure Sensors For Use In Harsh Environments"; U.S. Pat. No. 6,354,147, entitled "Fluid Parameter Measurement in Pipes Using Acoustic Pressures"; U.S. patent application Ser. No. 09/740,760, entitled "Apparatus for Sensing Fluid in a Pipe," filed Nov. 29, 2000; U.S. patent application Ser. No. 09/346,607, entitled "Flow Rate Measurement Using Unsteady Pressures," filed Jul. 2, 1999; U.S. patent application Ser. No. 09/997,221, entitled "Method And System For Determining The Speed Of Sound In A Fluid Within A Conduit," filed Nov. 28, 2001; U.S. Provisional Application Serial No. 60/250,997, entitled "Method And System For Determining The Speed Of Sound In A Fluid Within A Conduit," filed Dec. 4, 2000; and U.S. patent application Ser. No. 09/729,994, entitled "Method And Apparatus For Determining The Flow Velocity Within A Pipe," filed Dec. 4, 2000 all of which are incorporated herein by reference in their entirety.

TECHNICAL FIELD

This invention relates to multiphase flow measurement systems to monitor multiphase flow production. More particularly the present invention incorporates sound speed measurements to fundamentally improve the ability of multiphase flow measurement systems to determine phase flow rates of a fluid.

BACKGROUND ART

It is widely recognized that the ability to measure the individual flow rates of oil/water/gas within co-flowing mixtures of these substances has substantial economic value for the oil and gas industry. The industry has been actively developing multiphase flow meters for the past 20 years. During this development process, many techniques have been identified, evaluated, refined, and commercialized.

The numerous approaches to multiphase flow measurement of the prior art can typically be divided into two main categories of multiphase flow meters (MPFM's). The first category seeks to develop instruments to measure the oil/water/gas flow rates based on localized measurement. This is a typical industry approach in which a variety of measurements are made on the oil/gas/water mixture to help determine the flow rates of the individual components. This approach has focused on developing novel and robust instruments designed to provide precise multiphase flow measurements, such as dual-intensity gamma densitomers, microwave meters, capacitance and conductance meters, etc. Typically MPFM's are a collection of several essentially separate, but co-located measurement devices that provide a sufficient number of measurements to uniquely determine the flow rate at the meter location. Prior art multiphase flow meter manufacturers for monitoring hydrocarbon production include Roxar, Framo, and Fluenta, among others. These MPFM's are typically restricted to operate above the well, either on the surface or subsea, for various reasons including reliability in the harsh environment and complications due to the presence of electrical power. Since the MPFM's typically operate at pressures and temperatures determined by production conditions and operators are typically interested in oil and gas production at standard conditions, the flow rates measured at the meter location are translated to standard conditions through fluid properties data (Pressure, Temperature, and Volumetric properties (PVT)).

The second category of prior art MPFM's provides multiphase flow rate information by utilizing measurements distributed over the production system in conjunction with a mathematical description, or model, of the production system. The mathematical model utilizes multiphase flow models to relate the parameters sought to estimates for the measured parameters. The flow rates are determined by adjusting the multiphase flow rates to minimize the error between the distributed measurements and those predicted by the mathematical model. The type, number, and location of the measurements that enter into this global minimization process to determine flow rates can vary greatly, with cost, reliability and accuracy all entering into determining the optimal system.

Several prior art MPFM's have been developed utilizing distributed measurements to estimate production flow rates. Owing to the availability and relatively low cost and reliability of conventional pressure and temperature measurements, these systems have typically tended to focus on utilizing only distributed pressure and temperature measurements to determine flow rates. Unfortunately, the physics linking sparse pressure and temperature measurements to flow rates is rather indirect and relies on estimates of several, often ill-defined flow system properties such as viscosity and wall surface roughness. Thus, although it is theoretically possible to determine flow rates from a limited number of pressure and temperature measurements, it is generally difficult for such systems to match the accuracy of a dedicated multiphase flow measurement system as described above.

The distributed measurement approaches are fundamentally rooted in the relationship between flow rates and pressure and temperature. Specifically, pressure drop in flow within a pipe is due primarily to viscous losses which are related to flow rate, and hydrostatic head changes which are related to changes in density of fluid and hence composition. Axial temperature gradients are primarily governed by the radial heat transfer from the flow within the production tubing into the formation as the flow is produced and is related to the heat capacity of the fluid, heat transfer coefficients, and the flow rate. The pressure drop and temperature losses are used to predict flow rates. The fundamental problem with this approach is that the relationship between flow rate and either of these two parameters is highly uncertain and often must be calibrated or tuned on a case-by-case basis. For instance, it is known that it is extremely difficult to accurately predict pressure drop in multiphase flow.

It is also recognized that the accuracy of distributed measurement systems utilizing pressure and temperature measurements can be improved utilizing additional phase fraction measurements provided by prior art sensors such as density, dielectric, and sound wave measurements. These phase fraction measurements and/or volumetric flow rate measurements are performed by auxiliary sensors that constrain the global optimization for specific variables at specific locations. In addition to enhancing the overall accuracy and robustness, the auxiliary sensors reduce the need for in-situ tuning of the optimization procedure required to produce accurate results.

What is needed is a robust and accurate sensor apparatus for providing temperature, pressure and other flow related parameters to multiphase flow models. It is further necessary to provide a sensor that can survive in harsh downhole environments.

SUMMARY OF THE INVENTION

A multiphase flow measurement system is disclosed that incorporates fluid sound speed measurements into a multiphase flow model thereby fundamentally improving the system's ability to determine phase flow rates of a fluid. The distributed system includes at least one flow meter disposed along the pipe, an additional sensor disposed along the pipe spatially removed from the flow meter, and a multiphase flow model that receives the flow related parameters from the flow meter and the additional sensor to calculate the phase flow rates. Depending on production needs and the reservoir dimensions, the distributed system may utilize a plurality of flow meters disposed at several locations along the pipe and may further include a plurality of additional sensors as well. The distributed system preferably uses fiber optic sensors with Bragg gratings. This enables the system to have a high tolerance for long term exposure to harsh temperature environments and also provides the advantage of multiplexing the flow meters and/or sensors together.

The flow meter provides parameters to the well bore model including pressure, temperature, velocity and sound speed of the fluid. To provide these parameters, the flow meter includes a pressure assembly and a flow assembly, which may be coupled together as a single assembly or separated into two subassemblies. The pressure assembly preferably contains a pressure sensor for measuring the pressure of the fluid and/or a temperature sensor for measuring the temperature of the fluid. The flow assembly preferably contains a fluid sound speed sensor for measuring the fluid sound speed and/or a velocity sensor for measuring the bulk velocity and volumetric flow rate of the fluid.

The additional sensor, along with the flow meter, provides the necessary parameters for the multiphase flow model to determine phase flow rates. The additional sensor is disposed along the pipe at a location, spatially removed, from the flow meter, preferably vertically removed, for e.g., downstream from the flow meter. The additional sensor may measure temperature, pressure or with a plurality of additional sensors measure both temperature and pressure. This measurement may be taken at the well head of the pipe, and preferably below the main choke valve.

The measurements from the additional sensor and the flow meter are received by an optimization procedure which seeks to adjust the parameters of a multiphase flow model of the systems such that the error between the measurements recorded by the sensors and those simulated by the model is minimized. The parameters for which the error is minimized yields the desired flow rates. A variety of multiphase flow models may be used to determine the phase flow rates. Models have incorporated pressure and temperature measurements previously; however, the present invention incorporates a fluid sound speed measurement into the model which significantly improves the ability of the model to determine phase flow rates.

BEST MODE FOR CARRYING OUT THE INVENTION

Figure 1:
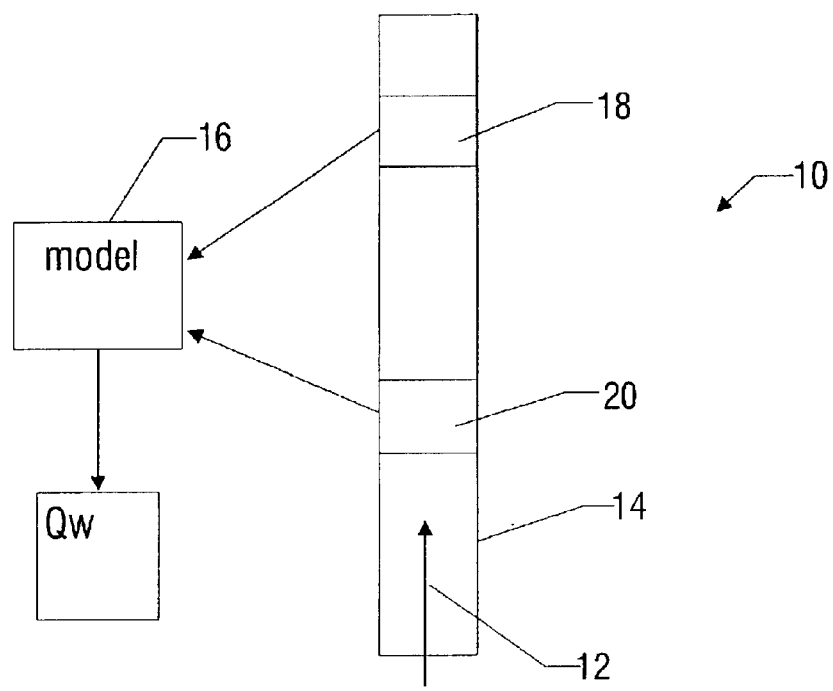
FIG. 1 is a schematic diagram of a prior art multiphase flow meter.

Referring to FIG. 1 there is shown a prior art MPFM 10 for monitoring flow rates of a multi-phase fluid represented by arrow 12 flowing within a pipe 14. Math model 16 of MPFM 10 utilizes output from sensor 18 and at least sensor 20 to predict the phase fraction flow rate of fluid 12. Sensors 18, 20 are typical prior art sensors described above that provide parameters to the model 16 such as temperature, pressure, and phase fraction. Model 16 utilizes the output of sensors 18, 20 to determine, among other things, axial momentum and radial heat transfer of the fluid 12. The axial momentum and radial heat transfer are calibrated to phase fraction volumetric flow rates at known conditions to provide an estimate of the global multi-phase flow rate Qw.

Figure 2:
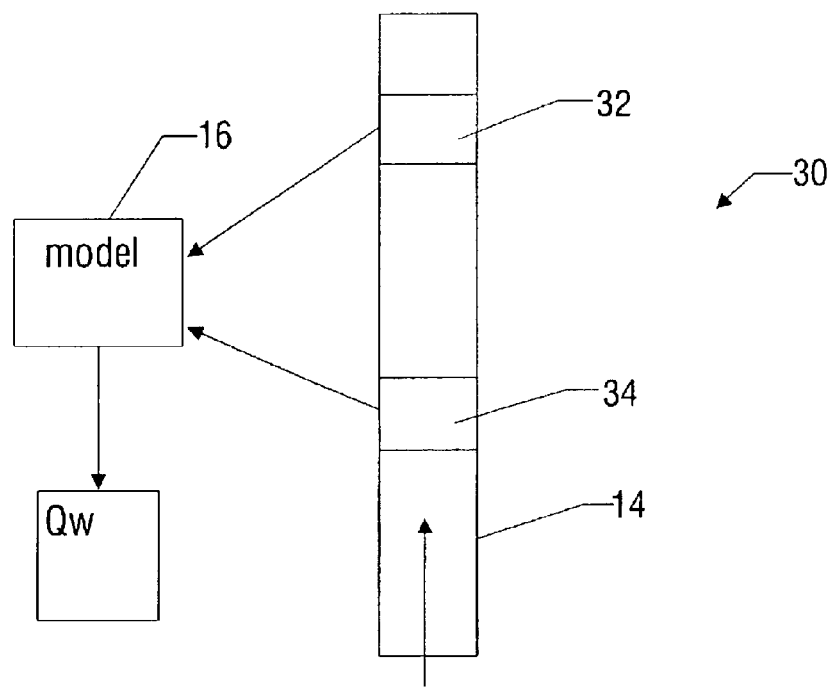
FIG. 2 is a schematic diagram of a single zone multiphase flow meter in accordance with the present invention.

Referring to FIG. 2 there is shown a MPFM 30 of the present invention, which utilizes sensor 32 and sensor 34. Sensor 32 and sensor 34 may comprise a single sensor or a sensor system comprising multiple sensors or sensor arrays. Sensors 32 and 34, which include fiber optic or electronically passive sensors, provide temperature, pressure, sound speed measurements and/or bulk velocity measurements of a multi-phase fluid 12 to system model 16. One sensor system, referred to as a "flow meter," that can be used to measure these parameters is disclosed in U.S. application Ser. No. 09/740,760, entitled "Apparatus for Sensing Fluid in a Pipe," filed Nov. 29, 2000, which is incorporated herein by reference in its entirety. This particular flow meter combines a fluid sound speed sensor with a velocity sensor. Model 16 utilizes the speed of sound and/or bulk velocity information to provide a robust and accurate multi-phase flow rate Qw to monitor multiphase flow production. Because the present invention preferably employs a fluid sound speed and fluid velocity, the methods for determining these parameters are disclosed in detail in the following sections.

I. Sound Speed Measurements

A. Basic Considerations

To provide fluid sound speed measurements to model 16, the present invention utilizes acoustic sensors 32, 34 and methods such as that described in U.S. Pat. No. 6,354,147, entitled "Fluid Parameter Measurement in Pipes Using Acoustic Pressure," which is incorporated herein by reference in its entirety, and discussed in further detail below. As described, the sensors provide sound speed measurements to model 16 by measuring acoustic pressure waves in the fluid 12. The invention preferably uses acoustic signals having lower frequencies (and thus longer wavelengths) than those used for ultrasonic meters, such as below about 20 kHz (depending on pipe diameter). Typically, for 3–7 inch production tubing, the desired frequency range is between 100–2000 hz. As such, the invention is more tolerant to the introduction of gas, sand, slugs, or other inhomogeneities in the fluid. As one skilled in the art would realize, the embodiment described below may also be referred to as a phase fraction meter or sound speed meter.

Figure 3:
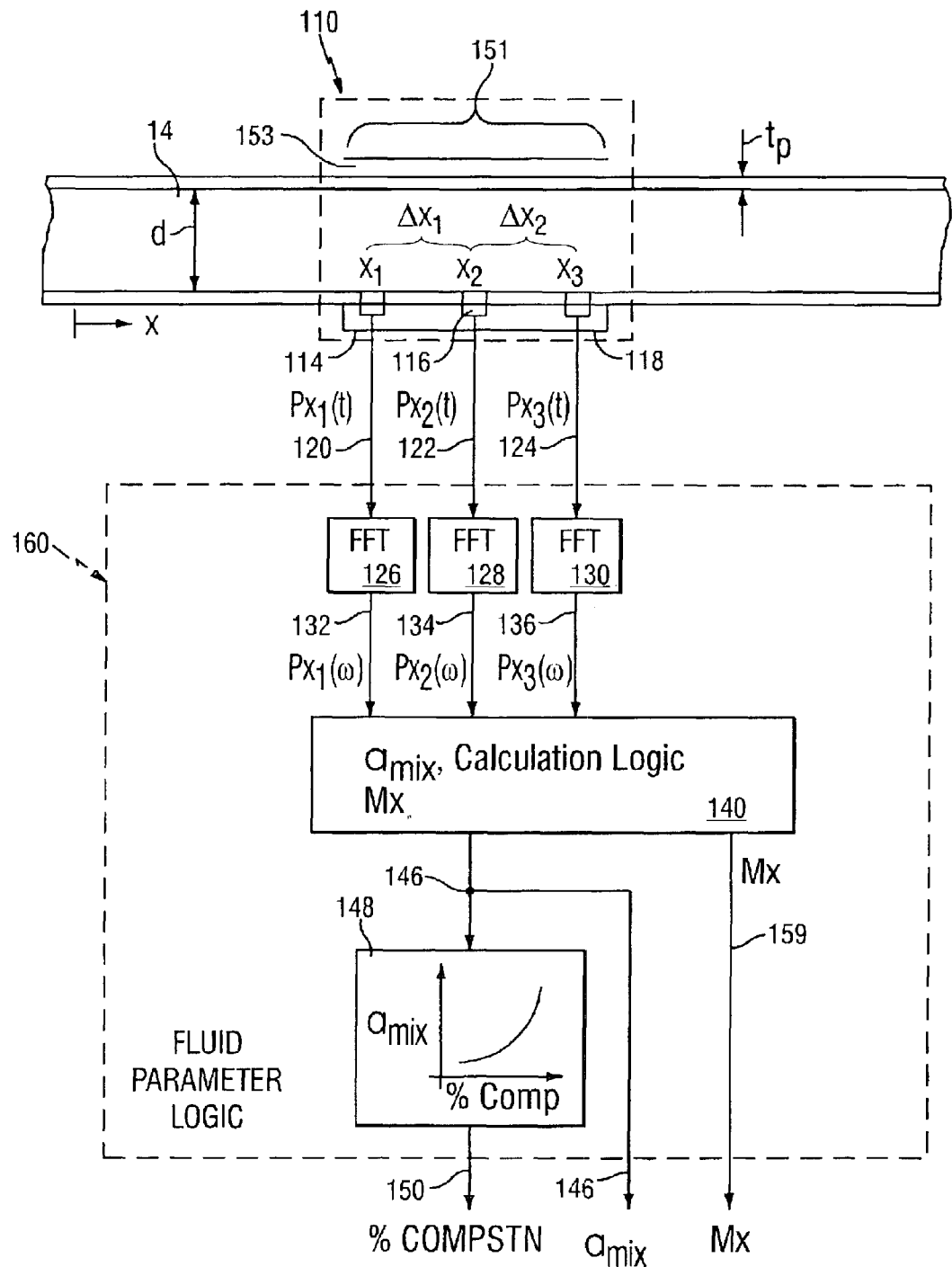
FIG. 3 is a schematic block diagram of a sound speed measurement system, in accordance with one aspect of the present invention.

FIG. 3 discloses a speed of sound meter that could be used for either of the sensors 32 or 34 in FIG. 2. Referring to FIG. 3, the pipe, or conduit, 14 has three unsteady pressure sensors 114, 116, 118, located at three locations $x_1$, $x_2$, $x_3$ along the pipe 14. The sensors 114, 116, 118 provide pressure time-varying signals $P_1(t)$, $P_2(t)$, $P_3(t)$ on lines 120, 122, 124, to known Fast Fourier Transform (FFT) logics 126, 128, 130, respectively. The FFT logics 126, 128, 130 calculate the Fourier transform of the time-based input signals $P_1(t)$, $P_2(t)$, $P_3(t)$ and provide complex frequency domain (or frequency based) signals $P_1(\omega)$, $P_2(\omega)$, $P_3(\omega)$ on lines 132, 134, 136 indicative of the frequency content of the input signals. Instead of FFTs, any other technique for obtaining the frequency domain characteristics of the signals $P_1(t)$, $P_2(t)$, $P_3(t)$, may be used. For example, the cross-spectral density and the power spectral density may be used to form frequency domain transfer functions (or frequency responses or ratios) discussed below.

The frequency signals $P_1(\omega)$, $P_2(\omega)$, $P_3(\omega)$ are fed to an $\alpha_{mix}$-Mx Calculation Logic 140 which provides a signal on a line 146 indicative of the speed of sound of the mixture $\alpha_{mix}$. The $\alpha_{mix}$ signal is provided to map (or equation) logic 148, which converts $\alpha_{mix}$ to a percent composition of the fluid and provides a "% Comp" signal on line 150. Also, if the Mach number, Mx, is not negligible and is desired to be known, the calculation logic 140 may also provide a signal Mx on a line 159 indicative of the Mach number (as discussed below).

For planar one-dimensional acoustic waves in a homogenous mixture, it is known that the acoustic pressure field P(x,t) at a location x along a pipe, where the wavelength $\lambda$ of the acoustic waves to be measured is long compared to the diameter d of the pipe 14 (i.e., $\lambda/d \gg 1$), may be expressed as a superposition of a right traveling wave and a left traveling wave, as follows:

$$P(x,t) = (Ae^{-ik_r x} + Be^{+ik_l x})e^{i\omega t} \qquad \text{Eq. 1}$$

where A and B are the frequency-based complex amplitudes of the right and left traveling waves, respectively, x is the pressure measurement location along a pipe, $\omega$ is frequency (in rad/sec, where $\omega = 2\pi f$), and $k_r$, $k_l$ are wave numbers for the right and left travelling waves, respectively, which are defined as:

$$k_r \equiv \left(\frac{\omega}{a_{mix}}\right)\frac{1}{1+M_x} \text{ and } k_l \equiv \left(\frac{\omega}{a_{mix}}\right)\frac{1}{1-M_x} \qquad \text{Eq. 2}$$

where $\alpha_{mix}$ is the speed of sound in the mixture in the pipe, $\omega$ is frequency (in rad/sec), and $M_x$ is the axial Mach number of the flow of the mixture within the pipe, where:

$$M_x \equiv \frac{V_{mix}}{a_{mix}} \qquad \text{Eq. 3}$$

where $V_{mix}$ is the axial velocity of the mixture. For non-homogenous mixtures, the axial Mach number represents the average velocity of the mixture and the low frequency acoustic field description remains substantially unaltered.

The frequency domain representation $P(x,\omega)$ of the time-based acoustic pressure field P(x,t) within a pipe, is the coefficient of the $e^{i\omega t}$ term of Eq. 1:

$$P(x,\omega) = Ae^{-k_r x} + Be^{+ik_l x} \qquad \text{Eq. 4}$$

Referring to FIG. 3, it has been determined that using Eq. 4 at three axially distributed pressure measurement locations $x_1$, $x_2$, $x_3$ along the pipe 14 leads to an equation for $\alpha_{mix}$ as a function of the ratio of frequency based pressure measurements, which allows the coefficients A and B to be eliminated. For optimal results, A and B are substantially constant over the measurement time and substantially no sound (or acoustic energy) is created or destroyed in the measurement section. The acoustic excitation enters the test section only through the ends of the test section 151 and, thus, the speed of sound within the test section 151 can be measured independent of the acoustic environment outside of the test section. In particular, the frequency domain pressure measurements $P_1(\omega)$, $P_2(\omega)$, $P_3(\omega)$ at the three locations $x_1$, $x_2$, $X_3$, respectively, along the pipe 14 using Eq. 1 for right and left traveling waves are as follows:

$$P_1(\omega) = P(x=x_1,\omega) = Ae^{-ik_r x_1} + Be^{+ik_l x_1} \qquad \text{Eq. 5}$$
$$P_2(\omega) = P(x=x_2,\omega) = Ae^{-ik_r x_2} + Be^{+ik_l x_2} \qquad \text{Eq. 6}$$
$$P_3(\omega) = P(x=x_3,\omega) = Ae^{-ik_r x_3} + Be^{+ik_l x_3} \qquad \text{Eq. 7}$$

where, for a given frequency, A and B are arbitrary constants describing the acoustic field between the sensors 114, 116, 118. Forming the ratio of $P_1(\omega)/P_2(\omega)$ from Eqs. 6 and 7, and solving for B/A, gives the following expression:

$$R \equiv \frac{B}{A} = \frac{e^{-ik_r x_1} - \left[\frac{P_1(\omega)}{P_2(\omega)}\right]e^{-ik_r x_2}}{\left[\frac{P_1(\omega)}{P_2(\omega)}\right]e^{ik_l x_2} - e^{ik_l x_1}} \qquad \text{Eq. 8}$$

where R is defined as the reflection coefficient.

Forming the ratio of $P_1(\omega)/P_3(\omega)$ from Eqs. 5 and 7 and solving for zero gives:

$$\frac{e^{-ik_r x_1} + Re^{ik_l x_1}}{e^{-ik_r x_3} + Re^{ik_l x_3}} - \left[\frac{P_1(\omega)}{P_3(\omega)}\right] = 0 \qquad \text{Eq. 9}$$

where R=B/A (Eq. 8) and $k_r$ and $k_l$ are related to $\alpha_{mix}$ (Eq. 2). Eq. 9 may be solved numerically, for example, by defining an "error" or residual term as the magnitude of the left side of Eq. 9, and iterating to minimize the error term.

$$mag\left[\frac{e^{-ik_r x_1} + Re^{ik_l x_1}}{e^{-ik_r x_3} + Re^{ik_l x_3}} - \left[\frac{P_1(\omega)}{P_3(\omega)}\right]\right] \equiv \text{Error} \qquad \text{Eq. 10}$$

By implementing various equations above, the speed of sound in the fluid may be computed by either: (1) varying $\alpha_{mix}$ while minimizing an error term, (2) calculating a logarithmic relationship between the acoustic pressure variation signals, or (3) calculating a trigonometric relationship between the acoustic pressure variation signals.

B. Determining Speed of Sound ($\alpha_{mix}$) by Minimizing an Error Term

For many applications in the oil industry, the axial velocity of the flow in the pipe is small compared to the speed of sound in the mixture (i.e., the axial Mach number $M_x$ is small compared to one). For example, the axial velocity of the oil $V_{oil}$ in a typical oil well is about 10 ft/sec and the speed of sound in oil $\alpha_{oil}$ is about 4,000 ft/sec. Thus, the Mach number Mx of a pure oil mixture is 0.0025 ($V_{oil}/\alpha_{oil}$ = 10/4,000), and Eq. 2 reduces to approximately:

$$k_r = k_l = \frac{\omega}{a_{\max}} \qquad \text{Eq. 11}$$

and the distinction between the wave numbers for the right and left traveling waves are eliminated. In that case (where Mx is negligible), because all of the variables in Eq. 10 are known except for $\alpha_{mix}$, the value for $\alpha_{mix}$ can be iteratively determined by evaluating the error term at a given frequency $\omega$ and varying $\alpha_{mix}$ until the error term goes to zero. The value of $\alpha_{mix}$ at which the magnitude of the error term equals zero (or is a minimum), corresponds to the correct value of the speed of sound in the mixture $\alpha_{mix}$. As Eq. 10 is a function of frequency $\omega$, the speed of sound $\alpha_{mix}$ at which the error goes to zero is the same for each frequency $\omega$ evaluated. Furthermore, since each frequency is an independent measurement of the same parameter, the multiple measurements may be weighted, averaged or filtered to provide a single more robust measurement of the speed of sound in the fluid.

Figure 4:
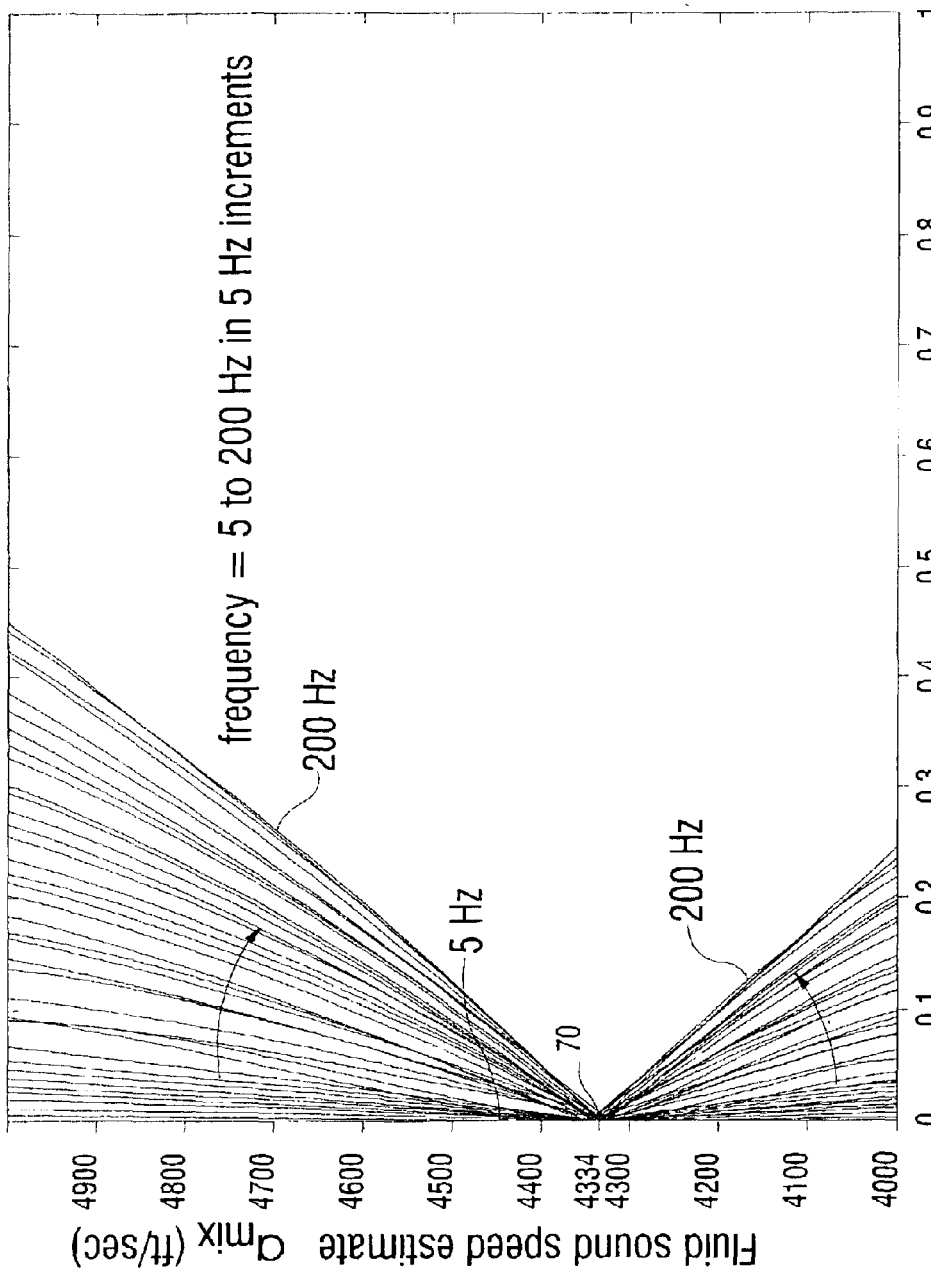
FIG. 4 is a graph of the magnitude of the fluid sound speed estimate versus an error term over a range of frequencies, in accordance with one aspect of the present invention.

Referring to FIG. 4, the error term of Eq. 10 constitutes a family of curves, one curve for each frequency ω, where the value of the error is evaluated for values of $\alpha_{mix}$ varied from $\alpha_{water}$ (5,000 ft/sec) to $\alpha_{oil}$ (4,000 ft/sec) at each frequency varied from 5 to 200 Hz in 5 Hz increments. Other frequencies may be used if desired. The speed of sound $\alpha_{mix}$ where the error goes to zero (or is minimized) is the same for each frequency ω evaluated. In this case, the error is minimized at a point 170 when $\alpha_{mix}$ is 4335 ft/sec.

C. Determining Speed of Sound ($\alpha_{mix}$) Using a Logarithmic Relationship

If the pressure sensors are equally spaced (i.e., $x_1-x_2=x_3-x_2=\Delta x$; or $\Delta x_1=\Delta x_2=\Delta x$) and if the axial Mach number Mx is small compared to one (and thus, $k_r=k_l=k$), Eq. 10 may be solved for k (and thus $\alpha_{mix}$) in a closed-form solution as a function of the pressure frequency responses (or frequency based signal ratios) as follows:

$$k = \frac{\omega}{a_{mix}} = \left[\frac{1}{\Delta x}\right] i\log\left[\frac{P_{12} + P_{13}P_{12} + (P_{12}^2 + 2P_{13}P_{12}^2 + P_{13}^2 P_{12}^2 - 4P_{13}^2)^{1/2}}{2P_{13}}\right] \quad \text{Eq. 12}$$

Solving for $\alpha_{mix}$, gives:

$$a_{mix} = \frac{\omega}{\left[\frac{1}{\Delta x}\right] i\log\left[\frac{P_{12} + P_{13}P_{12} + (P_{12}^2 + 2P_{13}P_{12}^2 + P_{13}^2 P_{12}^2 - 4P_{13}^2)^{1/2}}{2P_{13}}\right]} \quad \text{Eq. 13}$$

where $P_{12}=P_1(\omega)/P_2(\omega)$, $P_{13}=P_1(\omega)/P_3(\omega)$, i is the square root of 1. Because of the result of the Log function is also an imaginary number, a real number for the speed of sound $\alpha_{mix}$ is yielded.

The analytical solution to Eq. 10 as reflected in Eqs. 12 and 13 is valid primarily for the frequencies for which the length of the test section 151 along the pipe 14 (i.e., $x_3-x_1$ or $2\Delta x$ for equally spaced sensors) is shorter than the wavelength λ of the acoustic waves to be measured. This restriction results because of the multiple possible solutions for Eq. 10. Alternative solutions to Eq. 10 for other frequency ranges may be derived using a variety of known techniques.

D. Determining Speed of Sound ($\alpha_{mix}$) Using a Trigonometric Relationship An alternative closed form solution for $\alpha_{mix}$ (in a trigonometric form) from the three pressure equations 5–7, where the pressure sensors are equally spaced and Mx is negligible (i.e., $k_r=k_l$), can be calculated from the following equation:

$$\frac{P_1(\omega) + P_3(\omega)}{P_2(\omega)} = 2\cos(k\Delta x) = 2\cos\left(\frac{\omega \Delta x}{a_{mix}}\right) \quad \text{Eq. 14}$$

Eq. 14 is particularly useful due to its simple geometric form, from which $\alpha_{mix}$ can be easily interpreted. In particular, $\alpha_{mix}$ can be determined directly by inspection from a digital signal analyzer (or other similar instrument) set up to provide a display indicative of the left side of Eq. 14, which will be a cosine curve from which $\alpha_{mix}$ may be readily obtained. For example, at the zero crossing of the cosine wave, $\alpha_{mix}$ will be equal to $2\omega\Delta X/\pi$. Alternatively, Eq. 14 may be used to determine $\alpha_{mix}$ using an iterative approach where a measured function is calculated from the left side of Eq. 14 (using the measured pressures), which is compared to a cosine curve of the right side of Eq. 14, where $\alpha_{mix}$ is varied until it substantially matches the measured function. Various other curve fitting, parameter identification, and/or minimum error or solution techniques may be used to determine the value of $\alpha_{mix}$ that provides the best fit to satisfy Eq. 14.

Solving Eq. 14 for $\alpha_{mix}$, gives the following closed-form solution:

$$a_{mix} = \frac{\omega \Delta x}{\cos^{-1}\left(\frac{P_1(\omega) + P_3(\omega)}{2P_2(\omega)}\right)} = \frac{\omega \Delta x}{\cos^{-1}\frac{1}{2}\left(\frac{P_1(\omega)}{P_2(\omega)} + \frac{P_3(\omega)}{P_2(\omega)}\right)} \quad \text{Eq. 15}$$

E. Fluid Sound Speed Calculation Logic

Figure 5:
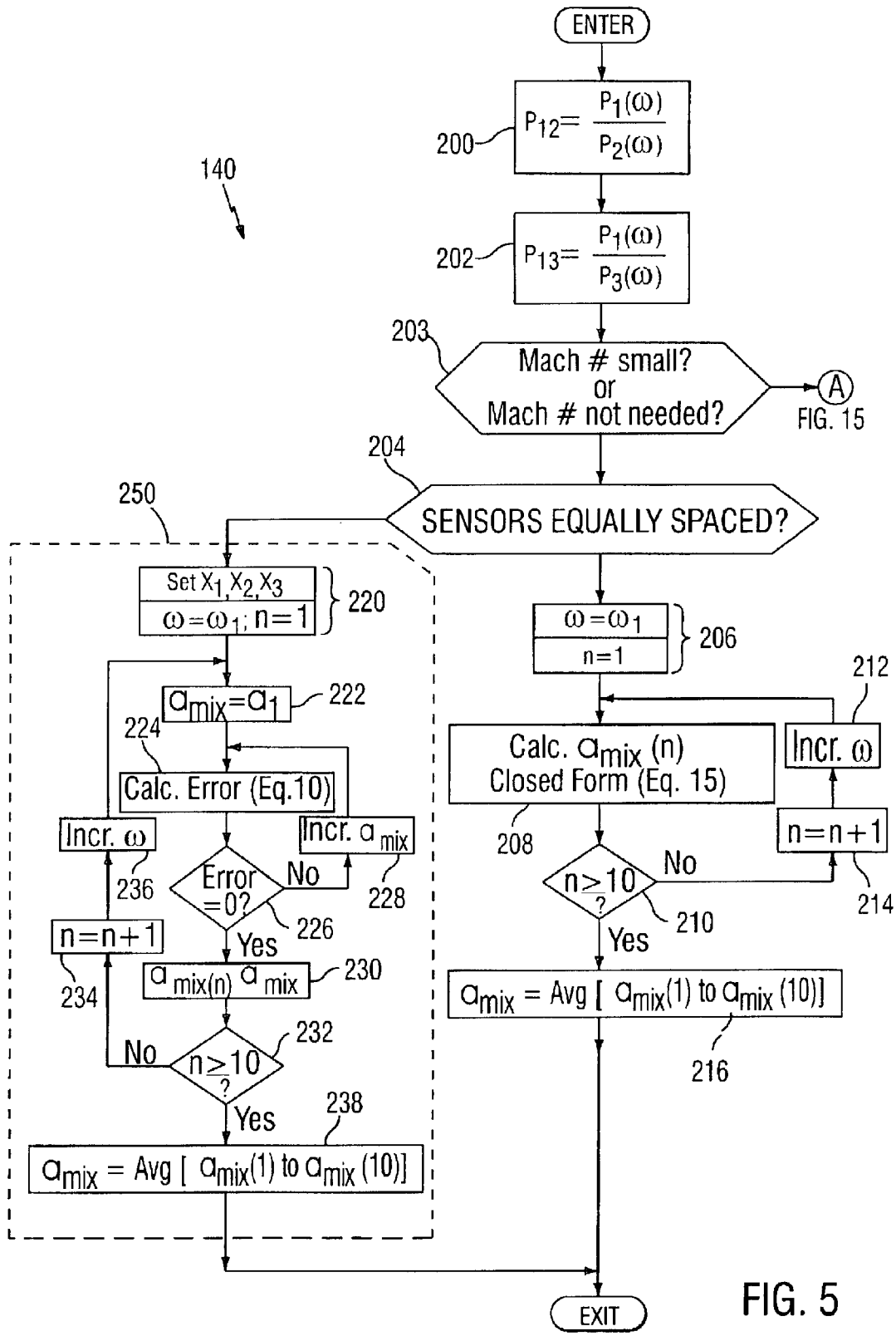
FIG. 5 is a portion of a logic flow diagram for measuring fluid sound speed, in accordance with one aspect of the present invention.

Referring to FIG. 5, the calculation logic 140 (see FIG. 3) begins at step 200 where $P_{12}$ is calculated as the ratio of $P_1(\omega)/P_2(\omega)$, and at step 202 where $P_{13}$ is calculated as the ratio of $P_1(\omega)/P_3(\omega)$. Next, step 203 determines whether the Mach number Mx of the mixture is negligible (or whether it is desirable to calculate Mx, i.e. for cases where Mx is not negligible, as set forth below with reference to "A" and FIG. 15). If Mx is negligible, step 204 determines if the sensors 114, 116, 118 are equally spaced (i.e., $x_1-x_2=x_2-X_3=\Delta x$). Assuming equally spaced sensors, step 206 sets initial values for ω=ω1 (e.g., 100 Hz) and a counter n=1. Next, step 208 calculates $\alpha_{mix}(n)$ from the closed form solution of Eq. 13. Then, step 210 checks whether the logic 140 has calculated $\alpha_{mix}$ at a predetermined number of frequencies, e.g., 10. If n is not greater than 10, steps 212 and 214 increment the counter n by one and increases the frequency ω by a predetermined amount (e.g., 10 Hz) and step 208 is repeated. If the logic 140 has calculated $\alpha_{mix}$ at 10 frequencies, logic 140 goes to step 216, which determines an average value for $\alpha_{mix}$ using the values of $\alpha_{mix}(n)$ over the 10 frequencies, and the logic 140 then exits.

If the sensors are not equally spaced, a series of steps 250 are performed starting with step 220, which sets $x_1$, $x_2$, and $X_3$ to the current pressure sensor spacing, and sets initial values for ω=ω1 (e.g., 100 Hz) and the counter n=1. Next, step 222 sets $\alpha_{mix}=\alpha_{mix-min}$ (e.g., $\alpha_{oil}$=4000 ft/sec) and step 224 calculates the error term from Eq. 10. Then, step 226 checks whether error=0. If the error does not equal zero, $\alpha_{mix}$ is incremented by a predetermined amount and the logic 140 goes to step 224.

Figure 15:
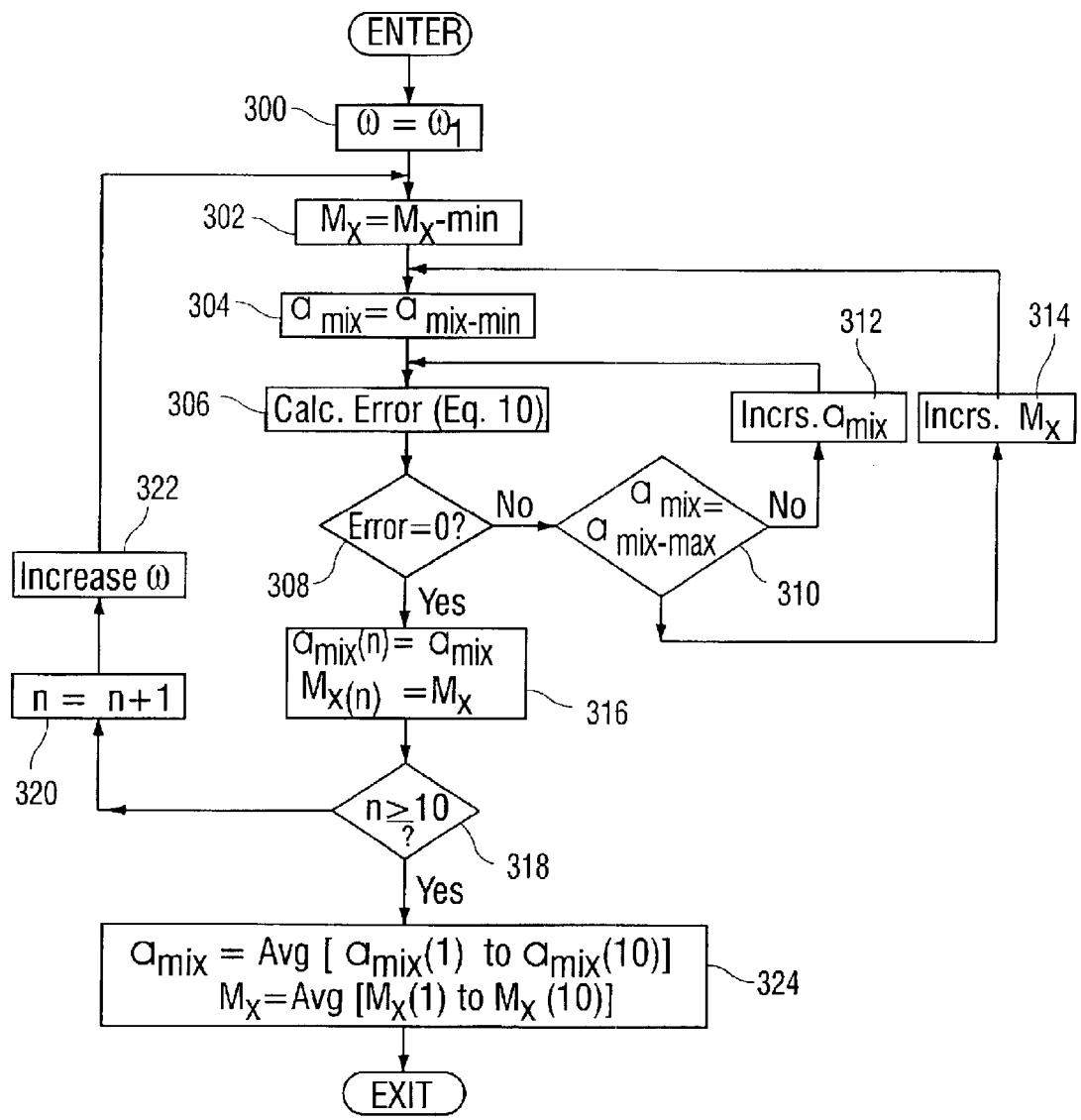
FIG. 15 is a continuation of the logic flow diagram of FIG. 5 for measuring fluid sound speed, in accordance with one aspect of the present invention.

If the error=0 (or a minimum) in step 226, step 230 sets $\alpha_{mix}(n)=\alpha_{mix}$. Next, step 232 checks whether n is greater than or equal to 10. If not, step 234 increments n by one and step 236 increases the frequency ω by a predetermined amount (e.g., 10 Hz) and continues at step 222 as shown in FIG. 15. If n is greater than or equal to 10, step 238 calculates an average value for $\alpha_{mix}$ over the 10 frequencies, and the logic 140 ends.

Referring to FIG. 15, if the Mach number Mx is not negligible, several steps 300, 302, 304 set initial conditions: ω=ω1 (e.g., 100 Hz); Mx=Mx-min (e.g., 0); $\alpha_{mix}=\alpha_{mix-min}$ (e.g., $\alpha_{oil}$=4000 ft/sec). Then, step 306 calculates the error term of Eq. 10. Next, step 308 checks whether the error=0 (or a minimum). If not, step 310 checks whether $\alpha_{mix}=\alpha_{mix-max}$ (e.g., $\alpha_{water}$=5000 ft/sec). If not, step 312 increases $\alpha_{mix}$ by a predetermined amount (e.g., 1 ft/sec) and the logic goes back to step 306. If the result of step 310 is yes, step 314 increases Mx by a predetermined amount (e.g., 1) and the logic goes back to step 304.

When step 308 indicates error=0 (or a minimum), step 316 sets $\alpha_{mix}(n)=\alpha_{mix}$ and Mx(n)=Mx, and step 318 checks whether the values of $\alpha_{mix}$ and Mx have been calculated at 10 different frequencies. If not, step 320 increments the counter n by one and step 322 increases the value of the frequency ω by a predetermined amount (e.g., 10 Hz), and the logic goes back to step 302. If the values of $\alpha_{mix}$ and Mx have been calculated at 10 different frequencies (i.e., n is equal to 10), step 324 calculates average values for $\alpha_{mix}(n)$ and Mx(n) at the 10 different frequencies to calculate $\alpha_{mix}$ and Mx, and the logic exists.

F. Fiber Optic Embodiments

Figure 6:
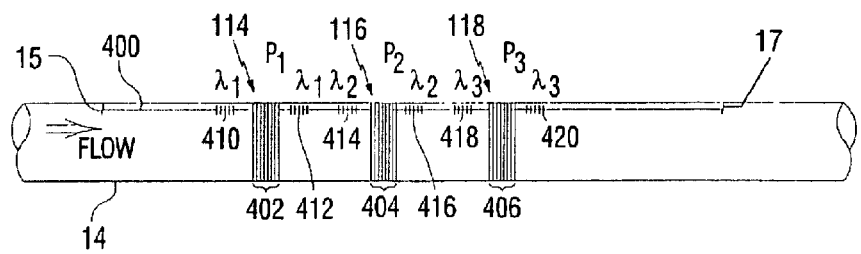
FIG. 6 is a side view of a pipe having optical fiber wrapped around the pipe at each measurement location separated by a pair of Bragg gratings, in accordance with one aspect of the present invention.

Referring to FIG. 6, for embodiments of the present invention utilizing fiber optic sensors with the wraps 402, 404, 406 connected in series, pairs of Bragg gratings (410, 412), (414, 416), (418, 420) may be located along the fiber 400 at opposite ends of each of the wraps 402, 404, 406, respectively. The grating pairs are used to multiplex the pressure signals $P_1$, $P_2$, $P_3$ to identify the individual wraps from optical return signals. The first pair of gratings 410, 412 around the wrap 402 may have a common reflection wavelength $\lambda_1$, and the second pair of gratings 414, 416 around the wrap 404 may have a common reflection wavelength $\lambda_2$, but different from that of the first pair of gratings 410, 412. Similarly, the third pair of gratings 418, 420 around the wrap 406 have a common reflection wavelength $\lambda_3$, which is different from $\lambda_1$ and $\lambda_2$. The fiber 400 may continue to other sensors as shown by reference numeral 17 or return the optical signals to the instrument as shown by reference numeral 15.

Figure 7:
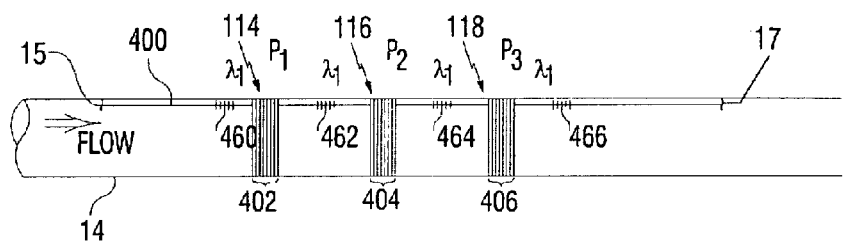
FIG. 7 is a side view of a pipe having optical fiber wrapped around the pipe at each measurement location with a single Bragg grating between each pair of optical wraps, in accordance with one aspect of the present invention.

Referring to FIG. 7, instead of having a different pair of reflection wavelengths associated with each wrap, a series of Bragg gratings 460, 462, 464, 466 with only one grating between each of the wraps 402, 404, 406 may be used, each having a common reflection wavelength $\lambda_1$.

Referring to FIGS. 6 and 7, the wraps 402, 404, 406 with the gratings 410, 412, 414, 416, 418, 420 (FIG. 22) or with the gratings 460, 462, 464, 466 (FIG. 7) may be configured in numerous known ways to precisely measure the fiber length or change in fiber length, such as by interferometric, Fabry Perot, time-of-flight, or other known arrangements. One example of time-of-flight (or Time-Division-Multiplexing; TDM) would be where an optical pulse having a wavelength is launched down the fiber 400 and a series of optical pulses are reflected back along the fiber 400. The length of each wrap can then be determined by the time delay between each return pulse.

While the gratings are shown oriented axially with respect to pipe 14 in FIGS. 6 and 7, the gratings may be oriented along the pipe 14 axially, circumferentially, or in any other orientations. Depending on the orientation, the grating may measure deformations in the pipe wall with varying levels of sensitivity. If the grating reflection wavelength varies with internal pressure changes, such variation may be desired for certain configurations (e.g., fiber lasers) or may be compensated for in the optical instrumentation for other configurations, e.g., by allowing for a predetermined range in reflection wavelength shift for each pair of gratings. Alternatively, instead of each of the wraps being connected in series, they may be connected in parallel, e.g., by using optical couplers (not shown) prior to each of the wraps, each coupled to the common fiber 400.

Figure 8:
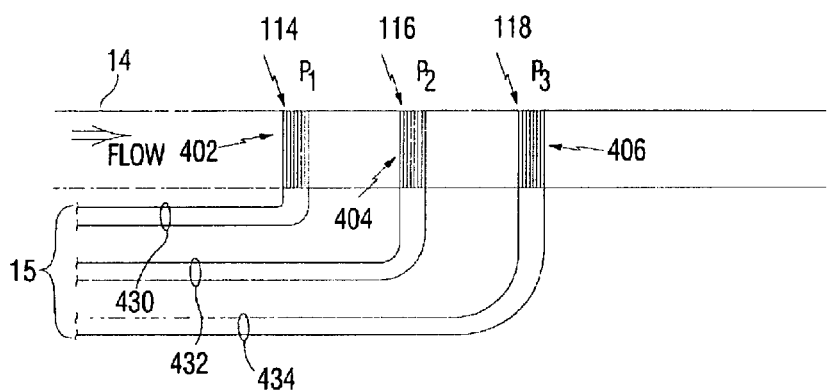
FIG. 8 is a side view of a pipe having optical fiber wrapped around the pipe at each measurement location without Bragg gratings, in accordance with one aspect of the present invention.

Referring to FIG. 8, alternatively, the sensors 114, 116, 118 may also be formed as a purely interferometric sensor by wrapping the pipe 14 with the wraps 402, 404, 406 without using Bragg gratings, in which case separate fibers 430, 432, 434 may be fed to the separate, corresponding wraps 402, 404, 406. In this particular embodiment, known interferometric techniques may be used to determine the length or change in length of the fiber wraps 402, 404, 406 around the pipe 14 due to pressure changes within the pipe. These known interferometric techniques include the Mach Zehnder or Michaelson Interferometric techniques that are described in U.S. Pat. No. 5,218,197, entitled "Method And Apparatus For The Non-Invasive Measurement Of Pressure Inside Pipes Using A Fiber Optic Interferometer Sensor," to Carroll. The inteferometric wraps may also be multiplexed as described in Dandridge, et al., "Fiber Optic Sensors for Navy Applications," IEEE, February 1991, or Dandridge, et al., "Multiplexed Interferometric Fiber Sensor Arrays," SPIE, Vol. 1586, 1991, pp. 176–183. Other techniques to determine the change in fiber length may also be used. Also, reference optical coils (not shown) may be used for certain interferometric approaches and may also be located on or around the pipe 14 but may be designed to be insensitive to pressure variations.

Figure 9:
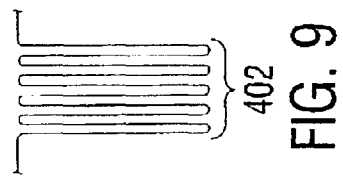
FIG. 9 is an alternative geometry of an optical wrap of radiator tube geometry, in accordance with one aspect of the present invention.
Figure 10:
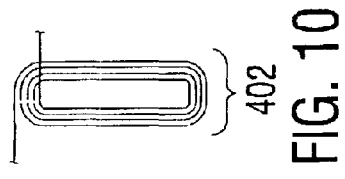
FIG. 10 is an alternative geometry of an optical wrap of a race track geometry, in accordance with one aspect of the present invention.

Referring to FIGS. 9 and 10, instead of the wraps 402, 404, 406 being optical fiber coils wrapped completely around the pipe 14, the wraps 402, 404, 406 may have alternative geometries, such as a "radiator coil" geometry, as shown in FIG. 9, or a "race-track" geometry, as shown in FIG. 10. Both of these alternative geometries are shown in a side view as if the pipe 14 is cut axially and laid flat. In this particular embodiment, the wraps 402, 404, 406 are not necessarily wrapped 360 degrees around the pipe, but may be disposed over a predetermined portion of the circumference of the pipe 14 with a length long enough to optically detect the changes to the pipe circumference. Other geometries for the wraps may be used if desired. Also, for any geometry of the wraps described, more than one layer of fiber may be used depending on the overall fiber length desired. The desired axial length of any particular wrap is set depending on the characteristics of the ac pressure desired to be measured, for example the axial length of the pressure disturbance caused by a vortex to be measured.

Figure 11:
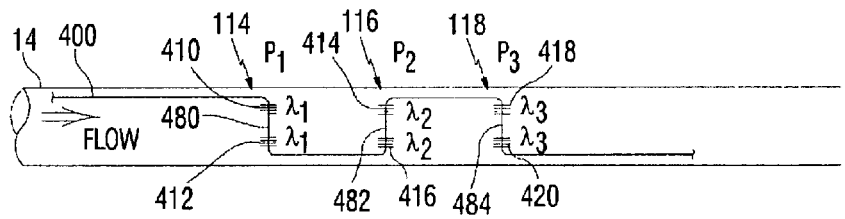
FIG. 11 is a side view of a pipe having a pair of gratings at each axial sensing location, in accordance with one aspect of the present invention.
Figure 12:
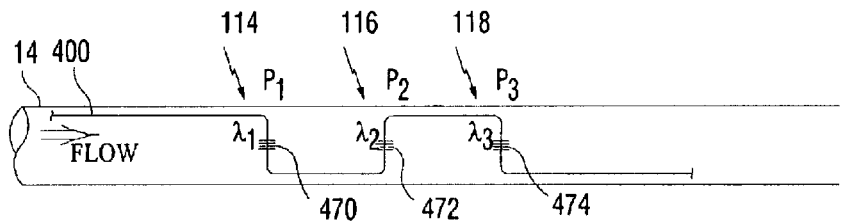
FIG. 12 is a side view of a pipe having a single grating at each axial sensing location, in accordance with one aspect of the present invention.

Referring to FIGS. 11 and 12, embodiments of the present invention include configurations wherein instead of using the wraps 402, 404, 406, the fiber 400 may have shorter sections that are disposed around at least a portion of the circumference of the pipe 14 that can optically detect changes to the pipe circumference. It is further within the scope of the present invention that sensors may comprise an optical fiber 400 disposed in a helical pattern (not shown) about pipe 14. As discussed above, the orientation of the strain sensing element will vary the sensitivity to deflections in pipe wall deformations caused by unsteady pressure signals in the pipe 14.

Figure 13:
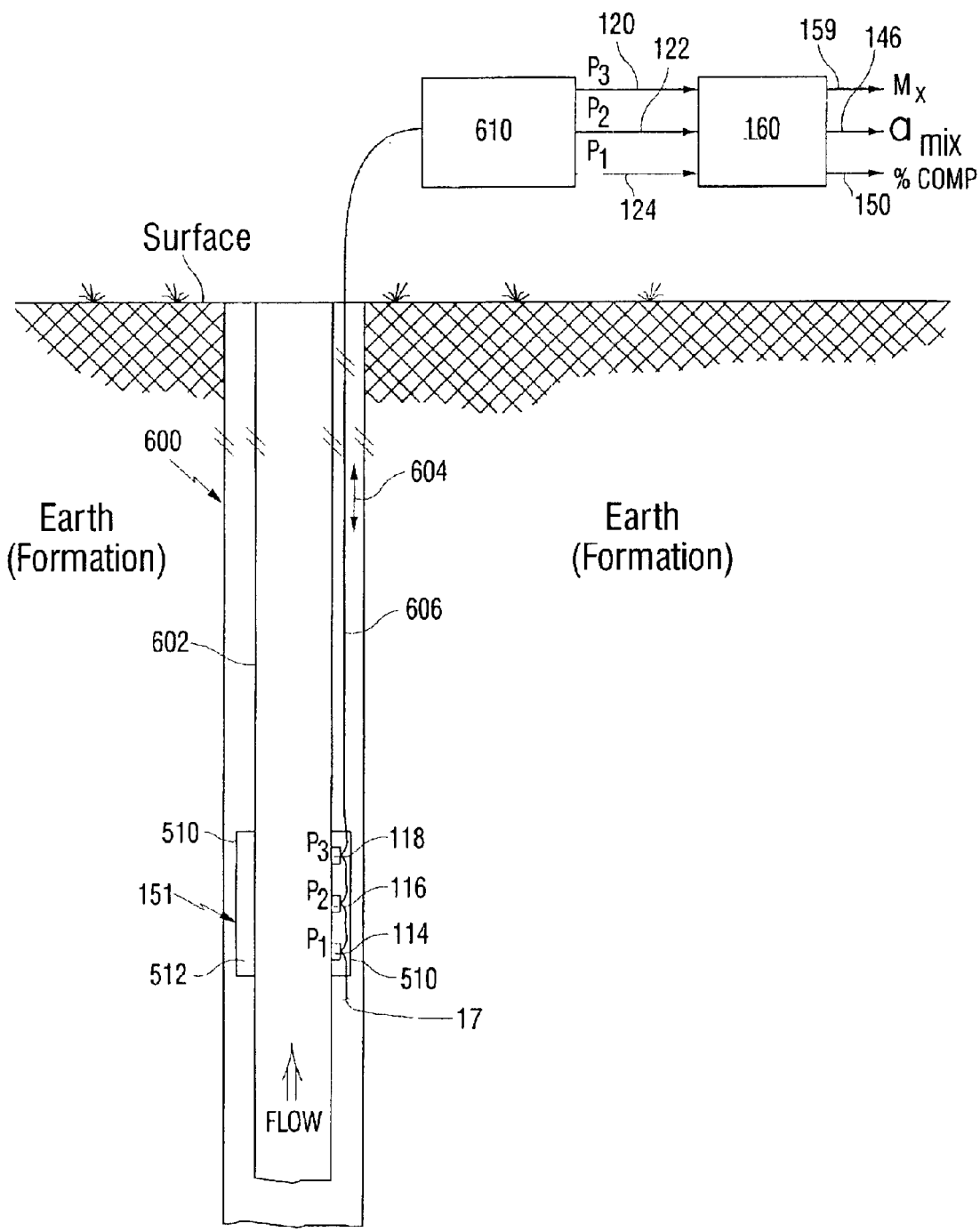
FIG. 13 is a schematic block diagram of a sound speed measurement system in an oil or gas well application, using fiber optic sensors, in accordance with one aspect of the present invention.

FIG. 13 illustrates an embodiment of a sound speed measurement system in an oil or gas well application. The sensing section 151 may be connected to or part of the production tubing 602 (analogous to the pipe 14 in the test section 151) within a well 600. An isolation sleeve 510 may be located over the sensors 114, 116, 118 and attached to the pipe 602 at its axial ends to protect the sensors 114, 116, 118 (or fibers) from damage during deployment, use, or retrieval. The isolation sleeve may also help isolate the sensors 114, 116, 118 from acoustic external pressure effects that may exist outside the pipe 602, and/or to help isolate ac pressures in the pipe 602 from ac pressures outside the pipe 602. The sensors 114, 116, 118 are connected to a cable 606 which may comprise an optical fiber 400 and is connected to a transceiver/converter 610 located outside the well 600.

When optical sensors are used, the transceiver/converter 610 may be used to receive and transmit optical signals 604 to the sensors 114, 116, 118 and provides output signals indicative of the pressure $P_1$, $P_2$, $P_3$ at the sensors 114, 116, 118 on the lines 120, 122, 124, respectively. Also, the transceiver/converter 610 may be part of the Fluid Parameter Logic 160. The transceiver/converter 610 may be any device that performs the corresponding functions described. In particular, the transceiver/converter 610 together with the optical sensors described above may use any type of optical grating-based measurement technique, e.g., scanning interferometric, scanning Fabry Perot, acousto-optic-tuned filter (AOTF), optical filter, time-of-flight, and may use WDM and/or TDM, etc., having sufficient sensitivity to measure the ac pressures within the pipe, such as that described in one or more of the following references: A. Kersey et al., "Multiplexed fiber Bragg grating strain-sensor system with a Fabry-Perot wavelength filter," Opt. Letters, Vol. 18, No. 16, August 1993; U.S. Pat. No. 5,493,390, issued Feb. 20, 1996, to Mauro Verasi, et al.; U.S. Pat. No. 5,317,576, issued May 31, 1994, to Ball et al.; U.S. Pat. No. 5,564,832, issued Oct. 15, 1996, to Ball et al.; U.S. Pat. No. 5,513,913, issued May 7, 1996 to Ball et al.; U.S. Pat. No. 5,426,297, issued Jun. 20, 1995, to Dunphy et al.; U.S. Pat. No. 5,401,956, issued Mar. 28, 1995, to Dunphy et al.; U.S. Pat. No. 4,950,883, issued Aug. 21, 1990, to Glenn; and U.S. Pat. No. 4,996,419, issued Feb. 26, 1991 to Morey, all of which are incorporated by reference. Also, the pressure sensors described may operate using one or more of the techniques described in the aforementioned references.

G. Determining Phase Fraction from the Measured Sound Speed

Turning back to FIG. 2, in particular, sensors 32, 34 provide sound speed measurements, by the method described above, which significantly enhance phase fraction determination over that of the prior art. Prior art phase fraction meters (microwave, dual beam densitometer, etc.) uniquely determine one of the phases of the fluid at the location of the meter. An advantage of the present invention is that a sound speed measurement does not uniquely determine the phase fractions, but rather provides a constraint on a combination of the phase fractions. In this manner, sound speed measurements are analogous to density measurements. The density of a well-mixed mixture of oil, water, and gas (immiscible mixture) is related to the phase fraction and the density of the individual components via the following relation:

$$\rho_{mix}=\rho_{oil}\phi_{oil}+\rho_w\phi_w+\rho_{gas}\phi_{gas} \qquad \text{Eq. 16}$$

Similarly, the sound speed of the mixture is related to the sound speed, the density and the phase fraction via the following relation:

$$\frac{1}{\rho_{mix}a_{mix}^2} = \frac{\phi_{oil}}{\rho_{oil}a_{oil}^2} + \frac{\phi_w}{\rho_w a_w^2} + \frac{\phi_{gas}}{\rho_{gas}a_{gas}^2} \qquad \text{Eq. 17}$$

$$\text{Where}: \sum_{i=1}^{N} \phi_i = 1$$

Where $\rho$ is the density of the mix or constituent of the multi-component mixture, $\alpha$ is the sound speed of the mix or constituent of the mixture, and $\phi$ is the volumetric phase fraction of the mix or constituent of the mixture. Thus, knowledge of the sound speed and densities of the oil, water, and gas components provide a relation between the sound speed of the mixture and the in-situ phase fraction of the fluids.

Figure 14:
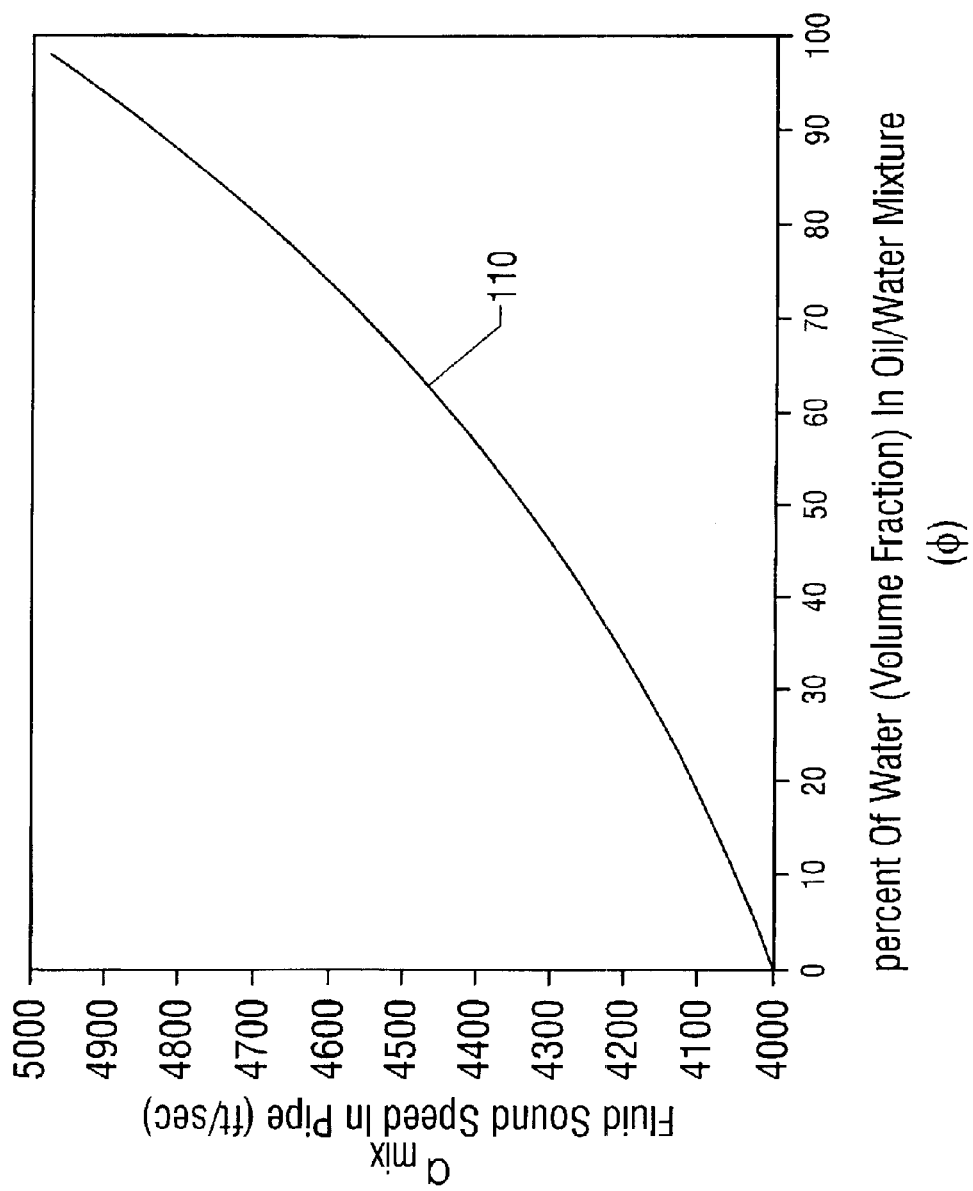
FIG. 14 is a graph of fluid sound speed versus the percent water volume fraction for an oil/water mixture, in accordance with one aspect of the present invention.

Referring to FIG. 14, where the fluid is an oil/water mixture, a curve 110 shows the speed of sound in the mixture $\alpha_{mix}$ plotted as a function of water volume fraction. For this illustrative example, the values used for density ($\rho$) and speed of sound ($\alpha$) in oil and water are as follows:

Density ($\rho$): $\rho_{water}$=1,000 kg/m³; $\rho_{oil}$=700 kg/m³

Speed of sound ($\alpha$): $\alpha_{water}$=5,000 ft/sec; $\alpha_{oil}$=4,000 ft/sec.

It should be understood that the present invention can be used to measure fluid volume fractions of a mixture of any number of fluids in which the speed of sound of the mixture $\alpha_{mix}$ is related to (or is substantially determined by) the volume fractions of two constituents of the mixture, e.g., oil/water, oil/gas, water/gas. The present invention can be used to measure the speed of sound of any mixture and can then be used in combination with other known quantities to derive phase content of mixtures with multiple (more than two) constituents.

H. Other Sound Speed Measurement Techniques

U.S. patent application Ser. No. 09/997,221, entitled "Method And System For Determining The Speed Of Sound In A Fluid Within A Conduit," filed Nov. 28, 2001, which claims priority to U.S. Provisional Application Serial No. 60/250,997, entitled "Method And System For Determining The Speed Of Sound In A Fluid Within A Conduit," filed Dec. 4, 2000, both disclose an alternative method for determining the speed of sound of a fluid within a pipe, and both are incorporated herein by reference in their entireties.

II. Bulk Velocity Measurements

A. Basic Considerations

The present invention further includes velocity sensors 32, 34 and methods for determining bulk velocity or volumetric flow rates such as that described in U.S. patent application Ser. No. 09/346,607, entitled, "Flow Rate Measurement Using Unsteady Pressures," filed Jul. 2, 1999, which is incorporated herein by reference in its entirety, and discussed in further detail below. Similar to that described previously with regard to sound speed measurements, the volumetric flow rate based on a cross correlation based flow rate measurement significantly improves distributed measurement flow rate determination utilizing model 16. For well-mixed flows of fluid 12 within a pipe 14, a homogeneous model 16 which assumes that all the phases are flowing at the same velocity may be sufficient. In other cases, slip models may be required to translate flow velocities provided from cross correlation measurements into individual component flow rates. In either case, the present invention incorporates cross correlation measurements that improve the predictive performance of the model 16 for multi-phase flow Qw information. As described below, the sensors provide bulk velocity measurement to model 16 (FIG. 2) by measuring vortical pressures in the fluid. As one skilled in the art would recognize the embodiment described below may be referred to as a flow meter.

Figure 16:
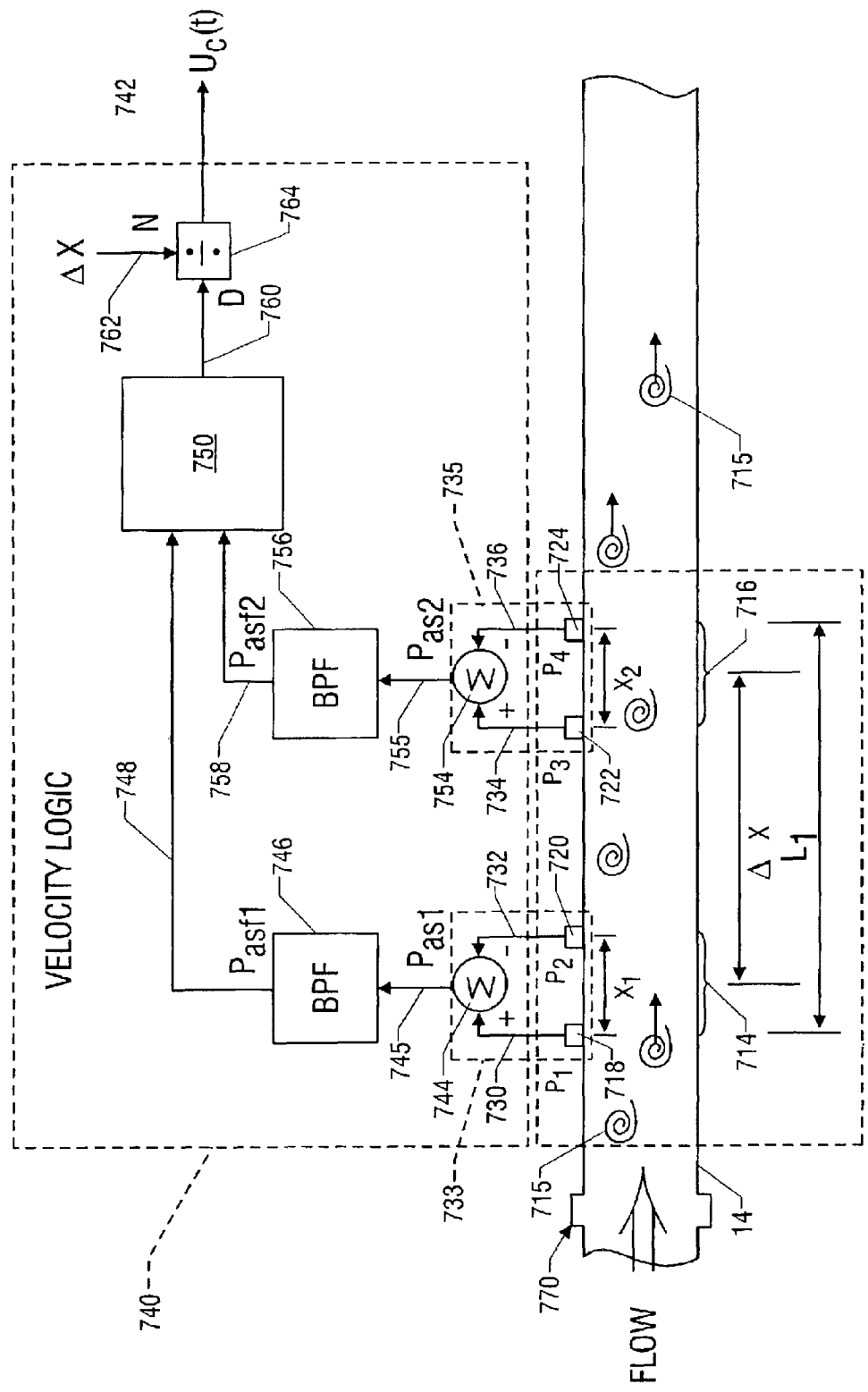
FIG. 16 is a schematic block diagram of a velocity measurement system, in accordance with one aspect of the present invention.

Referring to FIG. 16, a velocity and flow measurement system includes a sensing section 710 along a pipe, or conduit, 14 and a velocity logic section 740. The pipe 14 has two measurement regions 714, 716 located a distance $\Delta X$ apart along the pipe 14. At the first measurement region 714 are two unsteady (or dynamic or ac) pressure sensors 718, 720, located a distance $X_1$ apart, capable of measuring unsteady vortical pressures in the pipe 14, and at the second measurement region 716, are two other unsteady pressure sensors 722, 724, located a distance $X_2$ apart, also capable of measuring unsteady vortical pressures in the pipe 14. Each pair of pressure sensors 718, 720 and 722, 724 act as spatial filters to remove certain acoustic signals from the unsteady pressure signals, and the distances $X_1$, $X_2$ are determined by the desired filtering characteristic for each spatial filter, as discussed hereinafter.

The flow measurement system 710 of the present invention measures velocities associated with unsteady flow fields and/or pressure disturbances represented by 715 such as turbulent eddies (or vortical flow fields), inhomogeneities in the flow (such as bubbles, slugs, and the like), or any other properties of the flow, fluid, or pressure, having time varying or stochastic properties in the form of unsteady pressures. The vortical flow fields 715 are, in general, comprised of pressure disturbances having a wide variation in length scales and which have a variety of coherence length scales such as that described in the reference "Sound and Sources of Sound," A. P. Dowling et al, Halsted Press, 1983. Vortical flow fields often convect at or near the mean velocity of at least one of the fluids within a mixture flowing in a pipe. More specifically, the vortices convect in a predictable manner with reference to the fluids. The vortical pressure disturbances 715 that contain information regarding convection velocity have temporal and spatial length scales as well as coherence length scales that differ from other disturbances in the flow. The present invention utilizes these properties to preferentially select disturbances of a desired axial length scale and coherence length scale as will be more fully described hereinafter. For illustrative purposes, the terms vortical flow field and vortical pressure field will be used to describe the above-described group of unsteady pressure fields having temporal and spatial length and coherence scales described.

The pressures $P_1$, $P_2$, $P_3$, $P_4$ may be measured through holes in the pipe 14 ported to external pressure sensors or by other techniques discussed hereinafter. The pressure sensors 718, 720, 722, 724 provide time-based pressure signals $P_1(t)$, $P_2(t)$, $P_3(t)$, $P_4(t)$ on lines 730, 732, 734, 736, respectively, to Velocity Logic 740 which provides a convection velocity signal $U_c(t)$ on a line 742 which is related to an average flow rate $U_f(t)$ of the fluid flowing in the pipe 14 (where fluid may comprise one or more liquids and/or gases; where the gas(es) may be dissolved in the liquid or in free gas form, and wherein the fluid may include non-liquid elements).

In particular, in the Velocity Logic 740, the pressure signal $P_1(t)$ on the line 730 is provided to a positive input of a summer 744 and the pressure signal $P_2(t)$ on the line 732 is provided to a negative input of the summer 744. The output of the summer 744 is provided on a line 745 indicative of the difference between the two pressure signals $P_1$, $P_2$ (e.g., $P_1-P_2=P_{as1}$).

The pressure sensors 718, 720 together with the summer 744 create a spatial filter 733. The line 745 is fed to bandpass filter 746, which passes a predetermined passband of frequencies and attenuates frequencies outside the passband. In accordance with the present invention, the passband of the filter 746 is set to filter out (or attenuate) the dc portion and the high frequency portion of the input signals and to pass the frequencies therebetween. For example, in a particular embodiment bandpass filter 746 is set to pass frequencies from about 1 Hz to about 100 Hz, for a 3 inch ID pipe flowing water at 10 ft/sec. Other passbands may be used in other embodiments, if desired. Bandpass filter 746 provides a filtered signal $P_{asf1}$ on a line 748 to Cross-Correlation Logic 750, described below.

The pressure signal $P_3(t)$ on the line 734 is provided to a positive input of a summer 754 and the pressure signal $P_4(t)$ on the line 736 is provided to a negative input of the summer 754. The pressure sensors 722, 724 together with the summer 754 create a spatial filter 735. The output of the summer 754 is provided on a line 755 indicative of the difference between the two pressure signals $P_3$, $P_4$ (e.g., $P_3-P_4=P_{as2}$). The line 755 is fed to a bandpass filter 756, similar to the bandpass filter 746 discussed hereinbefore, which passes frequencies within the passband and attenuates frequencies outside the passband. The filter 756 provides a filtered signal $P_{asf2}$ on a line 758 to the Cross-Correlation Logic 750. The signs on the summers 744, 754 may be swapped if desired, provided the signs of both summers 744, 754 are swapped together. In addition, the pressure signals $P_1$, $P_2$, $P_3$, $P_4$ may be scaled prior to presentation to the summers 744, 754.

The Cross-Correlation Logic 750 calculates a known time domain cross-correlation between the signals $P_{asf1}$ and $P_{asf2}$ on the lines 748, 758, respectively, and provides an output signal on a line 760 indicative of the time delay τ it takes for an vortical flow field 715 (or vortex, stochastic, or vortical structure, field, disturbance or perturbation within the flow) to propagate from one sensing region 714 to the other sensing region 716. Such vortical flow disturbances, as is known, are coherent dynamic conditions that can occur in the flow which substantially decay (by a predetermined amount) over a predetermined distance (or coherence length) and convect (or flow) at or near the average velocity of the fluid flow. As described above, the vortical flow field 715 also has a stochastic or vortical pressure disturbance associated with it. In general, the vortical flow disturbances 715 are distributed throughout the flow, particularly in high shear regions, such as boundary layers (e.g., along the inner wall of the pipe 14) and are shown as discrete vortical flow fields 715. Because the vortical flow fields 715 (and the associated pressure disturbance) convect at or near the mean flow velocity, the propagation time delay τ is related to the velocity of the flow by the distance ΔX between the measurement regions 714, 716, as discussed below.

A spacing signal ΔX on a line 762 indicative of the distance ΔX between the sensing regions 714, 716 is divided by the time delay signal τ on the line 760 by a divider 764 which provides an output signal on the line 742 indicative of the convection velocity $U_c(t)$ of the fluid flowing in the pipe 14, which is related to (or proportional to or approximately equal to) the average (or mean) flow velocity $U_f(t)$ of the fluid, as defined below:

$$U_c(t)=\Delta X/\tau \propto U_f(t) \qquad \text{Eq. 18}$$

The convection velocity $U_c(t)$ may then be calibrated to more precisely determine the mean velocity $U_f(t)$ if desired. The result of such calibration may require multiplying the value of the convection velocity $U_c(t)$ by a calibration constant (gain) and/or adding a calibration offset to obtain the mean flow velocity $U_f(t)$ with the desired accuracy. For some applications, such calibration may not be required to meet the desired accuracy. The velocities $U_f(t)$, $U_c(t)$ may be converted to volumetric flow rate by multiplying the velocity by the cross-sectional area of the pipe.

Figure 17:
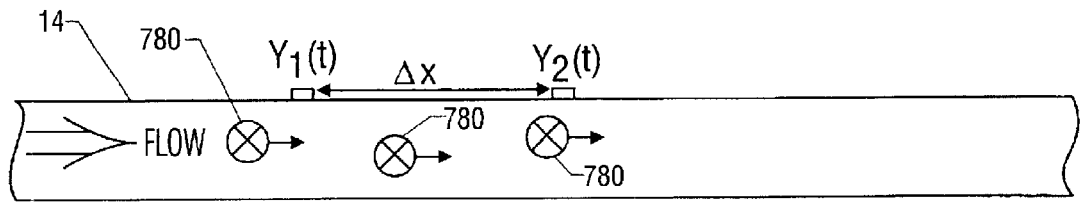
FIG. 17 is a side view of a pipe having two sensors that measure a vortical pressure in the pipe, as is known in the art.
Figure 18:
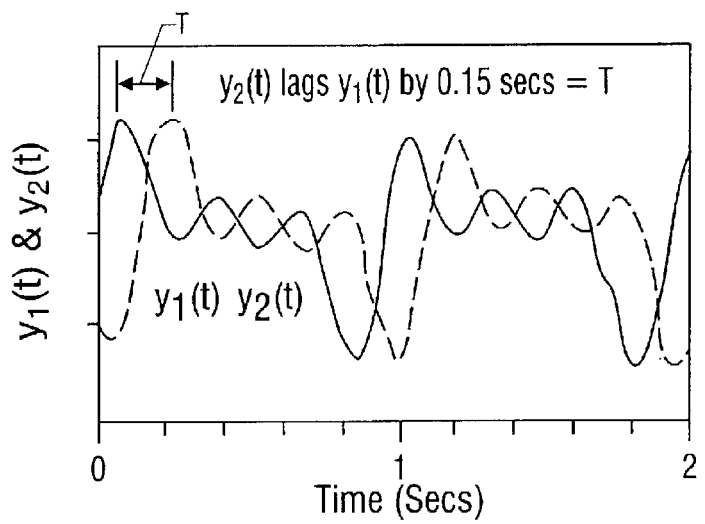
FIG. 18 is a graph of two curves, one from each of the two sensors of FIG. 17.
Figure 19:
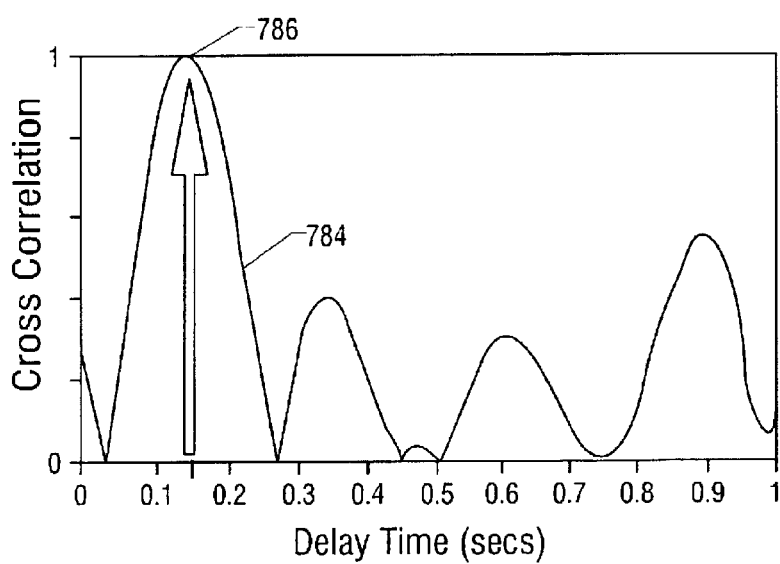
FIG. 19 is a graph of a cross-correlation between the two curves of FIG. 18.

Referring to FIGS. 17, 18, 19 as is known, cross-correlation may be used to determine the time delay τ between two signals $y_1(t)$, $y_2(t)$ separated by a known distance ΔX, that are indicative of quantities 780 that convect with the flow (e.g., density perturbations, concentration perturbations, temperature perturbations, vortical pressure disturbances, and other quantities). In FIG. 18, the signal $y_2(t)$ lags behind the signal $y_1(t)$ by 0.15 seconds. If a time domain cross-correlation is taken between the two signals $y_1(t)$, $y_2(t)$, the result is shown in FIG. 19 as a curve 784. The highest peak 786 of the curve 784 shows the best fit for the time lag τ between the two signals $y_1(t)$, $y_2(t)$ is at 0.15 seconds which matches the reference time delay shown in FIG. 18.

Referring to FIG. 16, as discussed hereinbefore, since pressure disturbances associated within the vortical flow field 715 convect (or flow) at or near the average velocity of the fluid flowing in the pipe 14, the vortical pressure disturbances observed at the downstream location 716 are substantially a time lagged version of the vortical pressure disturbances observed at the upstream location 714. However, the total vortical pressure perturbations or disturbances in a pipe may be expressed as being comprised of vortical pressure disturbances ($P_{vortical}$), acoustic pressure disturbances ($P_{acoustic}$) and other types of pressure disturbances ($P_{other}$) as shown below expressed in terms of axial position along the pipe at any point in time:

$$P(x,t) = P_{vortical}(x,t) + P_{acoustic}(x,t) + P_{other}(x,t) \qquad \text{Eq. 19}$$

As a result, the unsteady pressure disturbances $P_{vortical}$ can be masked by the acoustic pressure disturbances $P_{acoustic}$ and the other types of pressure disturbances $P_{other}$. In particular, the presence of the acoustic pressure disturbances that propagate both upstream and downstream at the speed of sound in the fluid (sonic velocity), can prohibit the direct measurement of velocity from cross-correlation of direct vortical pressure measurements.

The present invention uses temporal and spatial filtering to precondition the pressure signals to effectively filter out the acoustic pressure disturbances $P_{acoustic}$ and other long wavelength (compared to the sensor spacing) pressure disturbances in the pipe 14 at the two sensing regions 714, 716 and retain a substantial portion of the vortical pressure disturbances $P_{vortical}$ associated with the vortical flow field 715 and any other short wavelength (compared to the sensor spacing) low frequency pressure disturbances $P_{other}$. In accordance with the present invention, if the low frequency pressure disturbances $P_{other}$ are small, they will not substantially impair the measurement accuracy of $P_{vortical}$.

The $P_{vortical}$ dominated signals from the two regions 714, 716 are then cross-correlated to determine the time delay τ between the two sensing locations 714, 716. More specifically, at the sensing region 714, the difference between the two pressure sensors 718, 720 creates a spatial filter 733 that effectively filters out (or attenuates) acoustic disturbances for which the wavelength λ of the acoustic waves propagating along the fluid is long (e.g., ten-to-one) compared to the spacing $X_1$ between the sensors. Likewise the same is true for spatial filter 735. Other wavelength to sensor spacing ratios may be used to characterize the filtering, provided the wavelength to sensor spacing ratio is sufficient to satisfy the two-to-one spatial aliasing Nyquist criteria.

Figure 20:
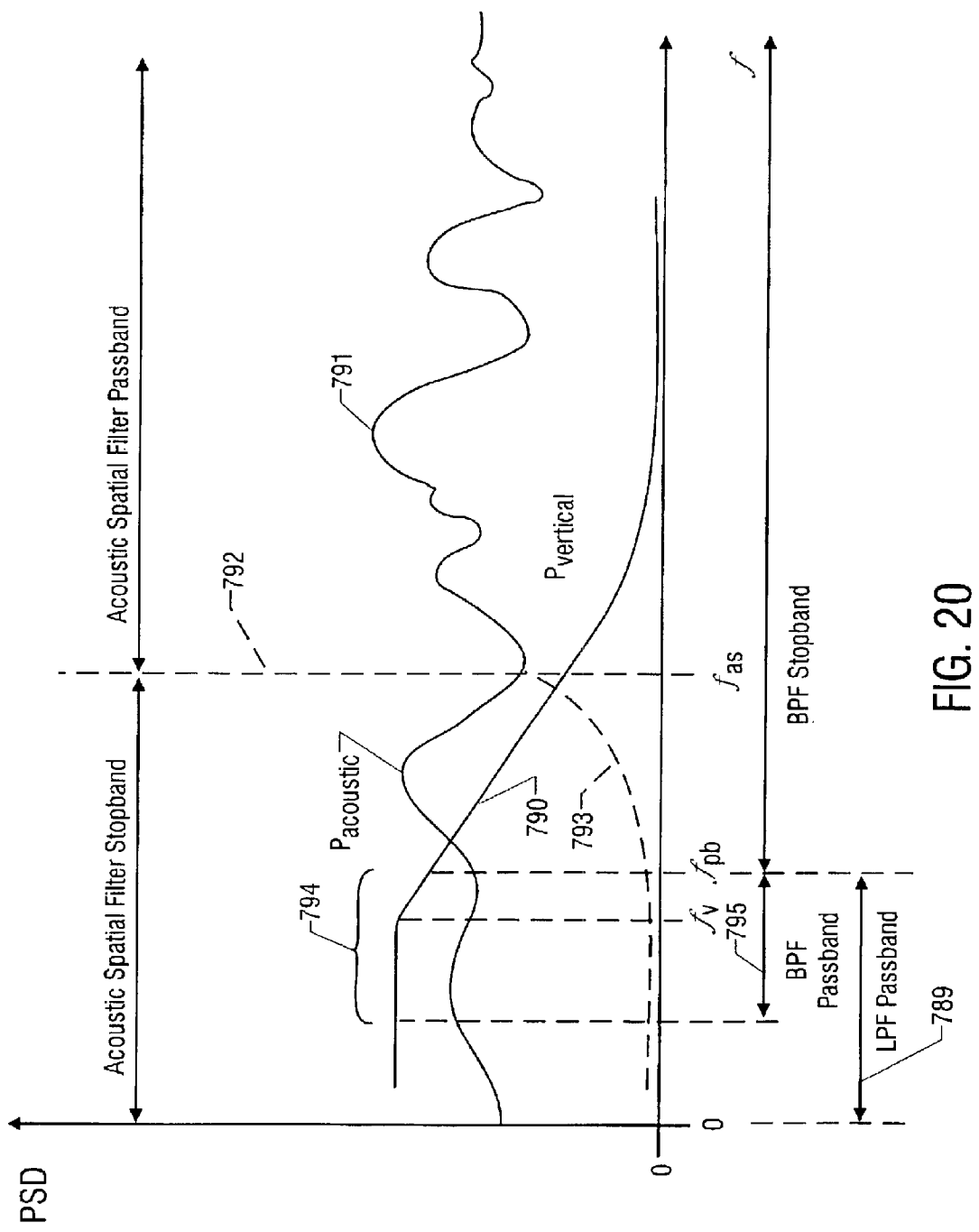
FIG. 20 is a graph of power spectral density plotted against frequency for an unsteady acoustic pressure signal $P_{acoustic}$ and unsteady vortical pressure signal $P_{vortical}$, in accordance with one aspect of the present invention.

Referring to FIG. 20, relevant features of the power spectral density (PSD) of typical vortical pressure disturbances $P_{Vortical}$ is shown by a curve 790 that has a flat region (or bandwidth) up to a frequency $F_v$ and then decreases with increasing frequency f. The value of $F_v$ is approximately equal to U/r, where U is the flow rate and r is the radius of the pipe. For example, for a flow rate U of about 10 ft/sec and a pipe radius r of about 0.125 ft (or about 1.5 inches), the bandwidth $F_v$ of the vortical pressure disturbances $P_{vortical}$ would be about 80 Hz (10/0.125). The PSD of the acoustic pressure disturbances $P_{acoustic}$ has a profile that is determined by the environment and other factors and is indicated in the figure by an arbitrary curve 791, and typically has both low and high frequency components.

The acoustic spatial filters 733, 735 (FIG. 16) discussed hereinbefore block or attenuate wavelengths longer than $\lambda_{as}$ and frequencies below $f_{as}$, as indicated by the region 796. Also, the bandpass filters (BPF) 746, 756 (FIG. 16) block or attenuate high frequencies above $f_{pb}$ having short and long wavelengths and pass frequencies below $f_{as}$ where the $P_{vortical}$ signals exist. Thus, after the spatial filters 733, 735 and the BPF's 746, 756, the resultant filtered signals $P_{asf1}$, $P_{asf2}$ on the lines 748, 758 (FIG. 16) will be dominated by the short wavelength unsteady pressure disturbances $P_{Vortical}$ at frequencies below $f_{pb}$ and as indicated by a portion 794 of the curve 790 in the BPF passband 795 (FIG. 20).

Accordingly, referring to FIG. 20, the spatial filters 733, 735 (FIG. 16) block the long wavelengths, which, for the acoustic pressure disturbances $P_{acoustic}$, occur at low frequencies as indicated to the left of a dashed line 792 at frequencies below the frequency $f_{as}$. A dashed line 793 indicates the attenuation of the acoustic pressure $P_{acoustic}$ signal 791 below the frequency $f_{as}$ at the output of the spatial filters. The vortical pressure disturbances $P_{vortical}$ are substantially not attenuated (or only slightly attenuated) because $P_{vortical}$ has short wavelengths at low frequencies that are substantially passed by the spatial filter. The BPF's 746, 756 (FIG. 16) block or attenuate frequencies outside the passband indicated by a range of frequencies 795, and passes the unsteady pressure disturbances associated with stochastic flow fields 715 (FIG. 16) within the passband 795.

Alternatively, instead of the filters 746, 756 being bandpass filters, provided the dc content is acceptably small, the filters 746, 756 may comprise low pass filters, having a bandwidth similar to the upper band of the high pass filters discussed hereinbefore. If a low pass filter is used as the filters 746, 756, the passband is shown as a range of frequencies 789. It should be understood that the filters 746, 756 are not required for the present invention if the PSD of the acoustic pressure disturbances $P_{acoustic}$ has substantially no or low PSD energy content in frequencies above the stopband of the spatial filter that does not adversely affect the measurement accuracy.

Figure 21:
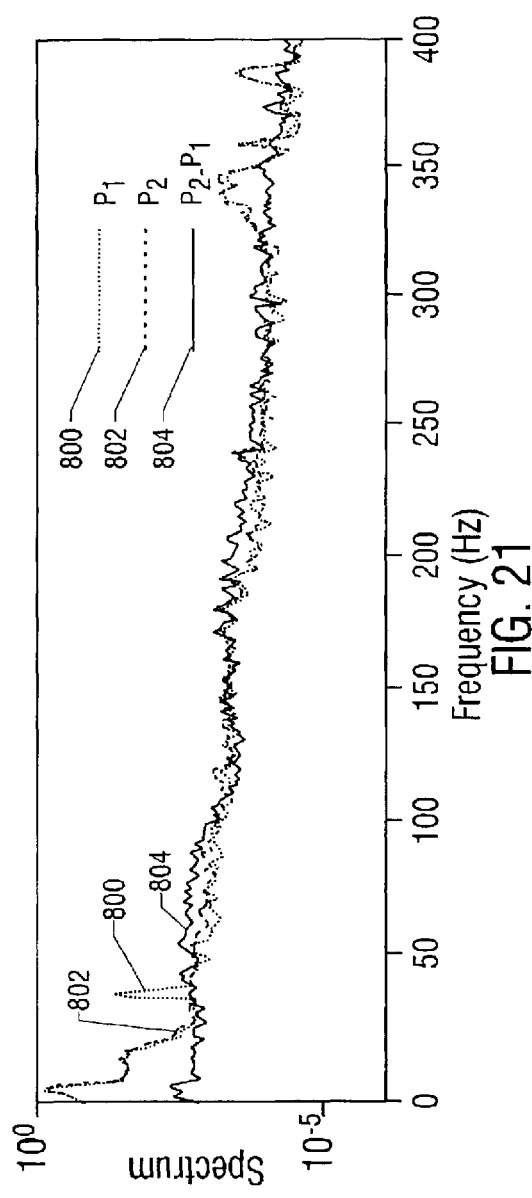
FIG. 21 is a graph of power spectrum of two unsteady vortical pressures and the difference between the two pressures, in accordance with one aspect of the present invention.

Referring to FIGS. 21 and 16, for the four ac pressure sensors 718, 720, 722, 724 evenly axially spaced at 1 inch apart ($X_1$, $X_2$) along the pipe 14, and providing ac pressure signals $P_1$, $P_2$, $P_3$, $P_4$, respectively, the frequency power spectrum for $P_1$ and $P_2$ are shown by curves 800, 802, respectively, for water flowing in an horizontal flow loop at a velocity of 11.2 ft/sec in a 2 inch diameter schedule 780 pipe using conventional piezoelectric ac pressure transducers. The power spectra of the curves 800, 802 are nearly identical. The power spectrum of the difference $P_{as1}$, between the two signals $P_1$, $P_2$, shown by a curve 804 is reduced in certain frequency bands (e.g., 100–150 Hz) and increased in other frequency bands (e.g., 200–250 Hz) as compared to the individual signals 800, 802.

Figure 22:
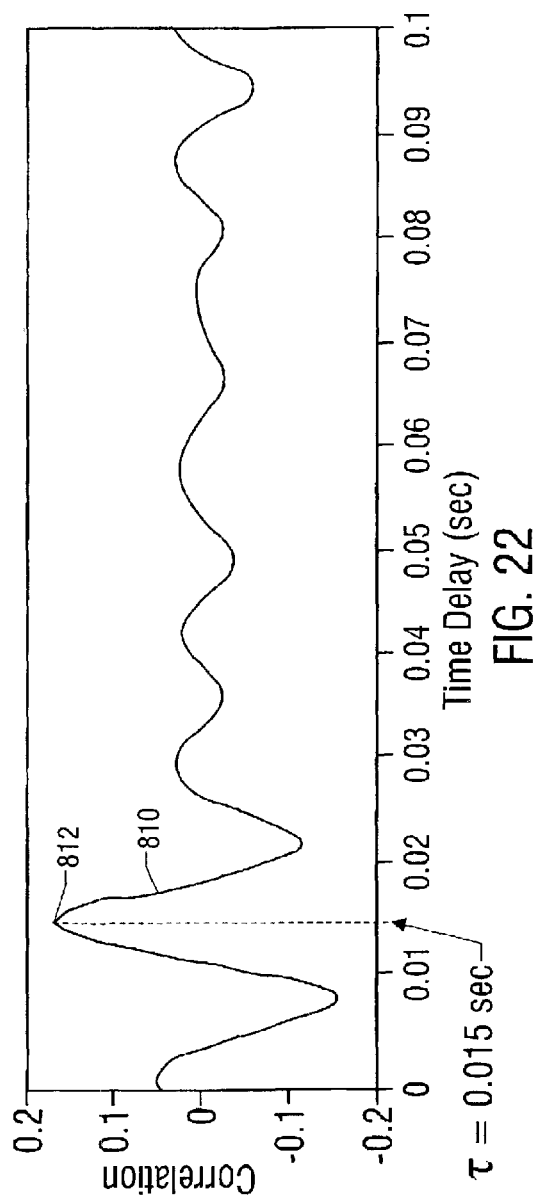
FIG. 22 is a graph of a cross-correlation between two of the curves of FIG. 21, in accordance with one aspect of the present invention.

Referring to FIGS. 22 and 16, the cross correlation between the signals $P_{as1}$ (or $P_1-P_2$) and $P_{as2}$ ($P_3-P_4$) is shown as a curve 810. The highest peak 812 indicates the best fit for the time lag between the two signals $P_{as1}$, $P_{as2}$ as 0.015 seconds. Because the four sensors $P_1$ to $P_4$ were evenly axially spaced 1 inch apart, the effective distance ΔX between the sensor pairs is 2 inches. Thus, the velocity measured from Eq. 18 is 11.1 ft/sec (2/12/0.015) using the present invention and the actual velocity was 11.2 ft/sec.

Figure 23:
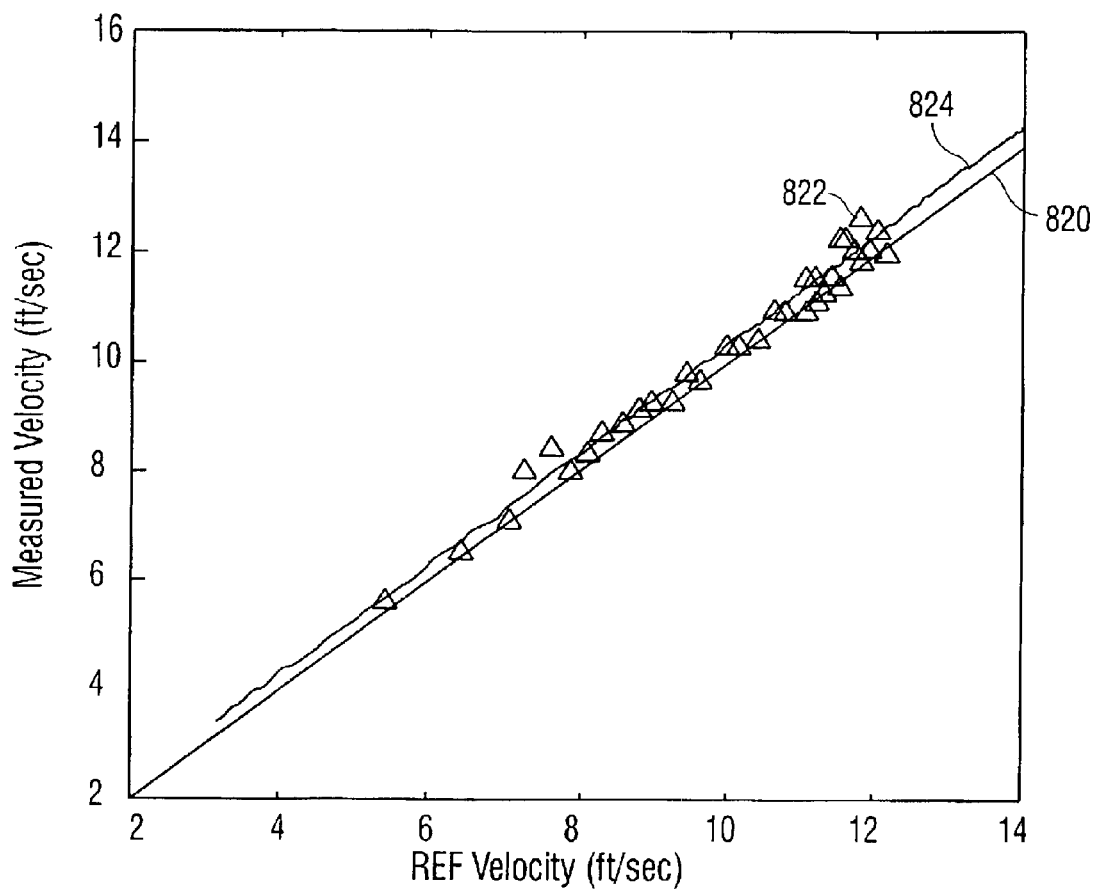
FIG. 23 is a graph of measured velocity against reference velocity, in accordance with one aspect of the present invention.

Referring to FIG. 23, for the configuration described with FIGS. 16, 21, 22 above, the velocity was measured at various flow rates and plotted against a reference velocity value. A solid line 820 shows the reference velocity, the triangles 822 are the measured data, and a line 824 is a curve fit of the data 822. This illustrates that the present invention predicts the flow velocity within a pipe (or conduit).

B. Fiber Optic Embodiments For Velocity Sensors

Figure 24:
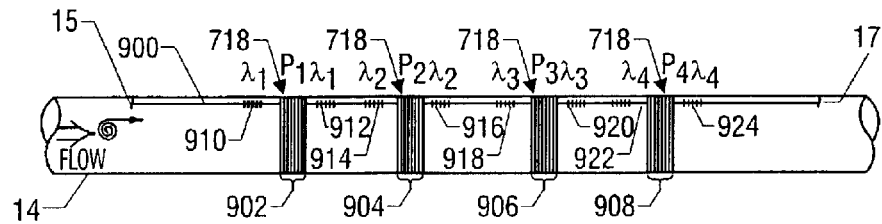
FIG. 24 is a side view of a pipe having optical fiber wrapped around the pipe at each measurement location separated by a pair of Bragg gratings, in accordance with one aspect of the present invention.
Figure 25:
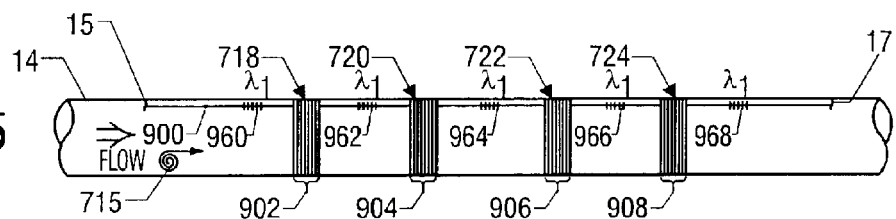
FIG. 25 is a side view of a pipe having optical fiber wrapped around the pipe at each measurement location with a single Bragg grating between each pair of optical wraps, in accordance with one aspect of the present invention.
Figure 26:
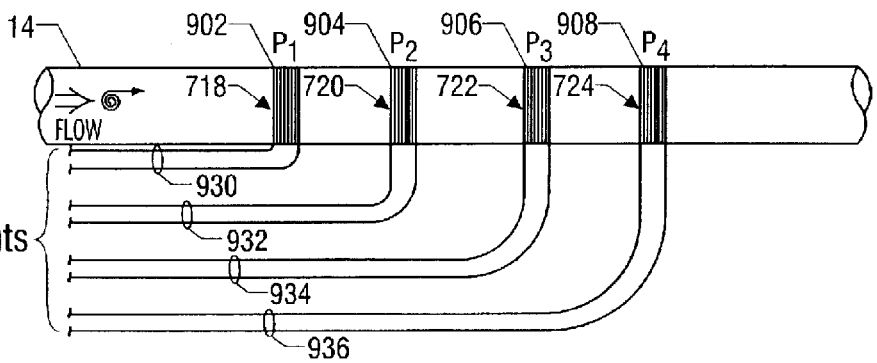
FIG. 26 is a side view of a pipe having optical fiber wrapped around the pipe at each measurement location without Bragg gratings, in accordance with one aspect of the present invention.

Referring to FIGS. 24, 25, 26 if an optical strain gage is used, the ac pressure sensors 718–724 may be configured using an optical fiber 900 that is coiled or wrapped around and attached to the pipe 14 at each of the pressure sensor locations as indicated by the coils or wraps 902, 904, 906, 908 for the pressures $P_1$, $P_2$, $P_3$, $P_4$, respectively. The fiber wraps 902–908 are wrapped around the pipe 14 such that the length of each of the fiber wraps 902–908 changes with changes in the pipe loop strain in response to unsteady pressure variations within the pipe 14 and thus internal pipe pressure is measured at the respective axial location. Such fiber length changes are measured using known optical measurement techniques as discussed hereinafter. Each of the wraps measures substantially the circumferentially averaged pressure within the pipe 14 at a corresponding axial location on the pipe 14. Also, the wraps provide axially averaged pressure over the axial length of a given wrap. While the structure of the pipe 14 provides some spatial filtering of short wavelength disturbances, we have found that the basic principle of operation of the invention remains substantially the same as that for the point sensors described previously.

Referring to FIG. 24, for embodiments of the present invention where the wraps 902, 904, 906, 908 are connected in series, pairs of Bragg gratings (910, 912), (914, 916), (918, 920), (922, 924) may be located along the fiber 900 at opposite ends of each of the wraps 902, 904, 906, 908, respectively. The grating pairs are used to multiplex the pressure signals $P_1$, $P_2$, $P_3$, $P_4$ to identify the individual wraps from optical return signals. The first pair of gratings 910, 912 around the wrap 902 may have a common reflection wavelength $\lambda_1$, and the second pair of gratings 914, 916 around the wrap 904 may have a common reflection wavelength $\lambda_2$, but different from that of the first pair of gratings 910, 912. Similarly, the third pair of gratings 918, 920 around the wrap 906 have a common reflection wavelength $\lambda_3$, which is different from $\lambda_1$, $\lambda_2$, and the fourth pair of gratings 922, 924 around the wrap 908 have a common reflection wavelength $\lambda_4$, which is different from $\lambda_1$, $\lambda_2$, $\lambda_3$. The fiber 400 may continue to other sensors as shown by reference numeral 17 or return the optical signals to the instrument as shown by reference numeral 15.

Referring to FIG. 25, instead of having a different pair of reflection wavelengths associated with each wrap, a series of Bragg gratings 960–968 with only one grating between each of the wraps 902–908 may be used each having a common reflection wavelength $\lambda_1$.

Referring to FIGS. 24 and 25 the wraps 902–908 with the gratings 910–924 (FIG. 24) or with the gratings 960–968 (FIG. 25) may be configured in numerous known ways to precisely measure the fiber length or change in fiber length, such as an interferometric, Fabry Perot, time-of-flight, or other known arrangements. An example of a Fabry Perot technique is described in U.S. Pat. No. 4,950,883, entitled "Fiber Optic Sensor Arrangement Having Reflective Gratings Responsive to Particular Wavelengths," to Glenn. One example of time-of-flight (or Time-Division-Multiplexing; TDM) would be where an optical pulse having a wavelength is launched down the fiber 900 and a series of optical pulses are reflected back along the fiber 900. The length of each wrap can then be determined by the time delay between each return pulse.

While the gratings 910–924 are shown oriented axially with respect to the pipe 14, in FIGS. 24 and 25, they may be oriented along the pipe 14 axially, circumferentially, or in any other orientations. Depending on the orientation, the grating may measure deformations in the pipe wall 952 with varying levels of sensitivity. If the grating reflection wavelength varies with internal pressure changes, such variation may be desired for certain configurations (e.g., fiber lasers) or may be compensated for in the optical instrumentation for other configurations, e.g., by allowing for a predetermined range in reflection wavelength shift for each pair of gratings. Alternatively, instead of each of the wraps being connected in series, they may be connected in parallel, e.g., by using optical couplers (not shown) prior to each of the wraps, each coupled to the common fiber 900.

Referring to FIG. 26, alternatively, the sensors 718–724 may also be formed as individual non-multiplexed interferometric sensor by wrapping the pipe 14 with the wraps 902–908 without using Bragg gratings where separate fibers 930, 932, 934, 936 may be fed to the separate wraps 902, 904, 906, 908, respectively. In this particular embodiment, known interferometric techniques may be used to determine the length or change in length of the fiber 710 around the pipe 14 due to pressure changes, such as Mach Zehnder or Michaelson Interferometric techniques, such as that described in U.S. Pat. No. 5,218,197, entitled "Method And Apparatus For The Non-Invasive Measurement Of Pressure Inside Pipes Using A Fiber Optic Interferometer Sensor," to Carroll.

The interferometric wraps may be multiplexed such as is described in Dandridge, et al, "Fiber Optic Sensors for Navy Applications," IEEE, February 1991, or Dandridge, et al, "Multiplexed Interferometric Fiber Sensor Arrays," SPIE, Vol. 1586, 1991, pp. 176–183. Other techniques to determine the change in fiber length may be used. Also, reference optical coils (not shown) may be used for certain interferometric approaches and may also be located on or around the pipe 14 but may be designed to be insensitive to pressure variations.

Figure 27:
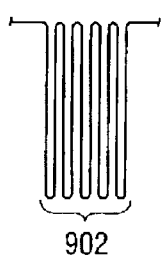
FIG. 27 is an alternative geometry of an optical wrap of a radiator tube geometry, in accordance with one aspect of the present invention.
Figure 28:
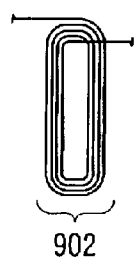
FIG. 28 is an alternative geometry of an optical wrap of a race track geometry, in accordance with one aspect of the present invention.

Referring to FIGS. 27 and 28, instead of the wraps 902–908 being optical fiber coils wrapped completely around the pipe 14, the wraps 902–908 may have alternative geometries, such as a "radiator coil" geometry (FIG. 27) or a "race-track" geometry (FIG. 28), which are shown in a side view as if the pipe 14 is cut axially and laid flat. In this particular embodiment, the wraps 902–908 are not necessarily wrapped 360 degrees around the pipe, but may be disposed over a predetermined portion of the circumference of the pipe 14, and have a length long enough to optically detect the changes to the pipe circumference. Other geometries for the wraps may be used if desired. Also, for any geometry of the wraps described, more than one layer of fiber may be used depending on the overall fiber length desired. The desired axial length of any particular wrap is set depending on the characteristics of the ac pressure desired to be measured, for example the axial length of the pressure disturbance caused by a vortex to be measured.

Figure 29:
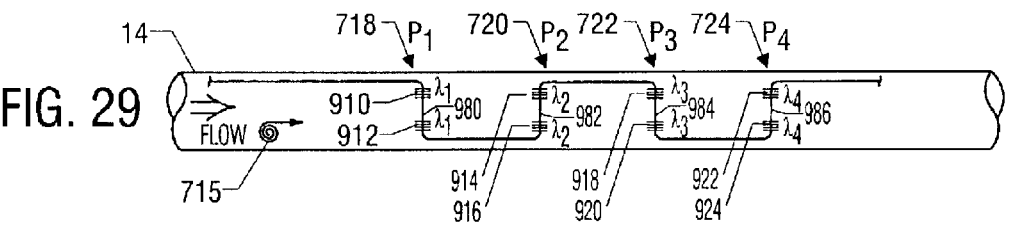
FIG. 29 is a side view of a pipe having a pair of gratings at each axial sensing location, in accordance with one aspect of the present invention.
Figure 30:
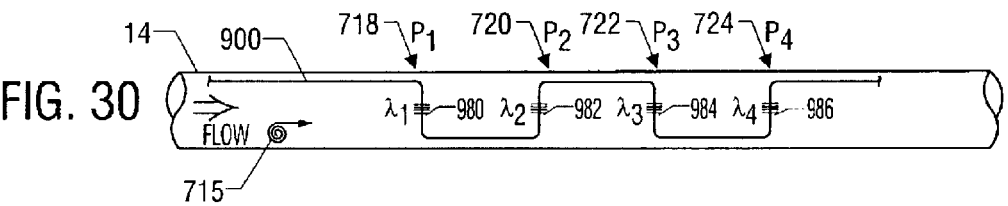
FIG. 30 is a side view of a pipe having a single grating at each axial sensing location, in accordance with one aspect of the present invention.

Referring to FIGS. 29 and 30, embodiments of the present invention include configurations wherein instead of using the wraps 902–908, the fiber 900 may have shorter sections that are disposed around at least a portion of the circumference of the pipe 14 that can optically detect changes to the pipe circumference. It is further within the scope of the present invention that sensors may comprise an optical fiber 900 disposed in a helical pattern (not shown) about pipe 14. As discussed above, the orientation of the strain sensing element will vary the sensitivity to deflections in pipe wall 952 caused by unsteady pressure transients in the pipe 14.

Referring to FIG. 29, in particular, the pairs of Bragg gratings (910, 912), (914, 916), (918, 920), (922, 924) are located along the fiber 900 with sections 980–986 of the fiber 900 between each of the grating pairs, respectively. In that case, known Fabry Perot, interferometric, time-of-flight or fiber laser sensing techniques may be used to measure the strain in the pipe, in a manner similar to that described in the aforementioned references.

Referring to FIG. 30, alternatively, individual gratings 970–976 may be disposed on the pipe and used to sense the unsteady variations in strain in the pipe 14 (and thus the unsteady pressure within the pipe) at the sensing locations. When a single grating is used per sensor, the grating reflection wavelength shift will be indicative of changes in pipe diameter and thus pressure.

Any other technique or configuration for an optical strain gage may be used. The type of optical strain gage technique and optical signal analysis approach is not critical to the present invention, and the scope of the invention is not intended to be limited to any particular technique or approach.

The present invention will also work over a wide range of oil/water/gas mixtures. Also, the invention will work for very low flow velocities, e.g., at or below 1 ft/sec (or about 20.03 gal/min, in a 3 inch diameter ID pipe) and has no maximum flow rate limit. Further, the invention will work with the pipe 14 being oriented vertical, horizontal, or any other orientation. Also the invention will work equally well independent of the direction of the flow along the pipe 14.

The thickness and rigidity of the outer wall of the pipe 14 is related to the acceptable spacing $X_1$ (FIG. 1) between the sensors 718, 720 of the spatial filter 733. More specifically, the thinner or less rigid the pipe 14 wall, the closer the sensors 718, 720 can be to each other.

Also, for optimal performance, the distance $X_1$ between the two sensors 718, 720 should be larger than the spatial length of the vortical pressure field 715 such that each of the sensors 718, 720 can independently measure the propagating vortical pressure field 715 between the sensors 718, 720 at different times (such that the spatial filter 733 output is not zero for the measured vortex 715). Also, the distance $X_1$ should be within the coherence length of the vortex 715 such that the spatial filter output is indicative of a measured vortex 715. Also, for optimal performance, the overall length $L_1$ between the first sensor 718 and the last sensor 724 of the velocity sensing section should be within the coherence length of the vortices 715 desired to be measured. The coherence length of the vortical flow field 715 is the length over which the vortical flow field remains substantially coherent, which is related to and scales with the diameter of the pipe 14.

Vortices that are sensed by only one of the spatial filters, because either a vortex is generated between the spatial filters or generated outside the spatial filters and decay between them, will be substantially random events (in time and location) that will not be correlated to the vortices that are sensed by and continuously occurring past both spatial filters and, as such, will not significantly affect the accuracy of the measurement.

Figure 31:
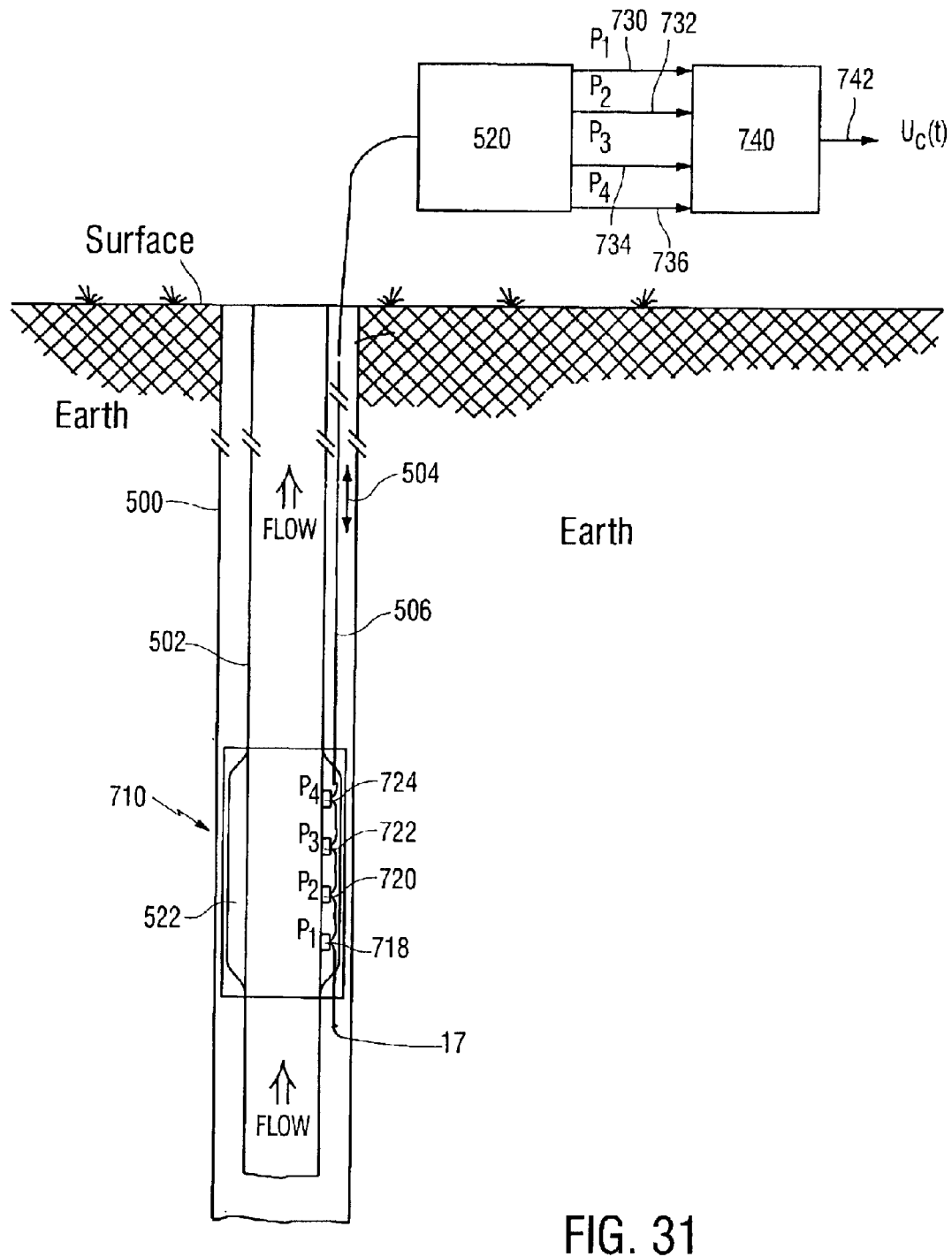
FIG. 31 is a schematic block diagram of a velocity measurement system in an oil or gas well application, using fiber optic sensors, in accordance with one aspect of the present invention.

FIG. 31 illustrates an embodiment of a velocity measurement system in an oil or gas well application. The sensing section 710 may be connected to or part of production tubing 502 within a well 500. An outer housing, sheath, or cover 522 may be located over the sensors 718–724 and attached to the pipe (not shown) at the axial ends to protect the sensors 718–724 (or fibers) from damage during deployment, use, or retrieval, and/or to help isolate the sensors from external pressure effects that may exist outside the pipe 14, and/or to help isolate ac pressures in the pipe 14 from ac pressures outside the pipe 14.

The sensors 718–724 are connected to a cable 506 which may comprise the optical fiber 900 (FIG. 16) and is connected to a transceiver/converter 520 located outside the well.

When optical sensors are used, the transceiver/converter 520 may be used to receive and transmit optical signals to the sensors 718–724 and provides output signals indicative of the pressure $P_1$–$P_4$ at the sensors 18–24 on the lines 730–736, respectively.

Also, the transceiver/converter 520 may be part of the Velocity Logic 740. The transceiver/converter 520 may be any device that performs the corresponding functions described. In particular, the transceiver/converter 520 together with the optical sensors described hereinbefore may use any type of optical grating-based measurement technique, e.g., scanning interferometric, scanning Fabry Perot, acousto-optic-tuned filter (AOTF), optical filter, time-of-flight, etc., having sufficient sensitivity to measure the ac pressures within the pipe, such as that described in one or more of the following references: A. Kersey et al., "Multiplexed Fiber Bragg Grating Strain-Sensor System With A Fabry-Perot Wavelength Filter," Opt. Letters, Vol. 18, No. 16, August 1993; U.S. Pat. No. 5,493,390, issued Feb. 20, 1996 to Mauro Verasi, et al.; U.S. Pat. No. 5,317,576, issued May 31, 1994, to Ball et al.; U.S. Pat. No. 5,564,832, issued Oct. 15, 1996 to Ball et al.; U.S. Pat. No. 5,513,913, issued May 7, 1996, to Ball et al.; U.S. Pat. No. 5,426,297, issued Jun. 20, 1995, to Dunphy et al.; U.S. Pat. No. 5,401,956, issued Mar. 28, 1995 to Dunphy et al.; U.S. Pat. No. 4,950,883, issued Aug. 21, 1990 to Glenn; U.S. Pat. No. 4,996,419, issued Feb. 26, 1991 to Morey, all of which are incorporated by reference. Also, the pressure sensors described may operate using one or more of the techniques described in the aforementioned references.

C. Other Velocity Measurement Techniques

U.S. patent application Ser. No. 09/729,994, entitled "Method And Apparatus For Determining The Flow Velocity Within A Pipe," filed Dec. 4, 2000, discloses an alternative method for determining the velocity of a fluid within a pipe, and is incorporated herein by reference in its entirety.

III. Determining Flow Rates of Components in a Multiphase Mixture

The present disclosure is not only useful in determining phase fractions (i.e. the quantity of each phase) in a fluid mixture, but is also useful in determining phase flow rates (i.e. the speed at which each phase flows in the mixture) by incorporating speed of sound measurements into a typical multiphase flow model. Multiphase flow models have been used in the past with distributed pressure and temperature measurements to determine phase flow rates as demonstrated in Nerby, et al., "Cost Effective Technique for Production Testing," (1995) Offshore Technology Conference in Houston, U.S.A., pp. 505–515, incorporated herein by reference in its entirety. A specific multiphase flow model is not needed for the present invention; any well-known multiphase flow models may be used. Therefore, the model itself will be described below in somewhat general terms as the exact methods differ between available models. The model itself is not the novel feature of the present invention; instead, it is the incorporation of a fluid sound speed measurement into the model, which provides a more accurate determination of phase flow rates.

Multiphase flow models incorporating only pressure and temperature measurements have difficulty in predicting phase flow rates. This may largely result from the temperature measurement, because experience has shown that temperature remains difficult to measure accurately. Without accurate measurements the model cannot accurately describe the fluid. Furthermore, if temperature is used in the error function of the flow model (Eq. 22, discussed below), a description of the overall heat transfer characteristics of the well is necessary but, unfortunately, difficult to establish. Another problem appears, which is discussed in detail below, when evaluating the error function of the phase flow rates; namely multiple local minima appear. As one skilled in the art would know, error functions exhibiting many local minima make it difficult to find the true solution. Incorporating fluid sound speed into known multiphase flow models significantly increases the capability of a model to predict phase flow rates.

Figure 32:
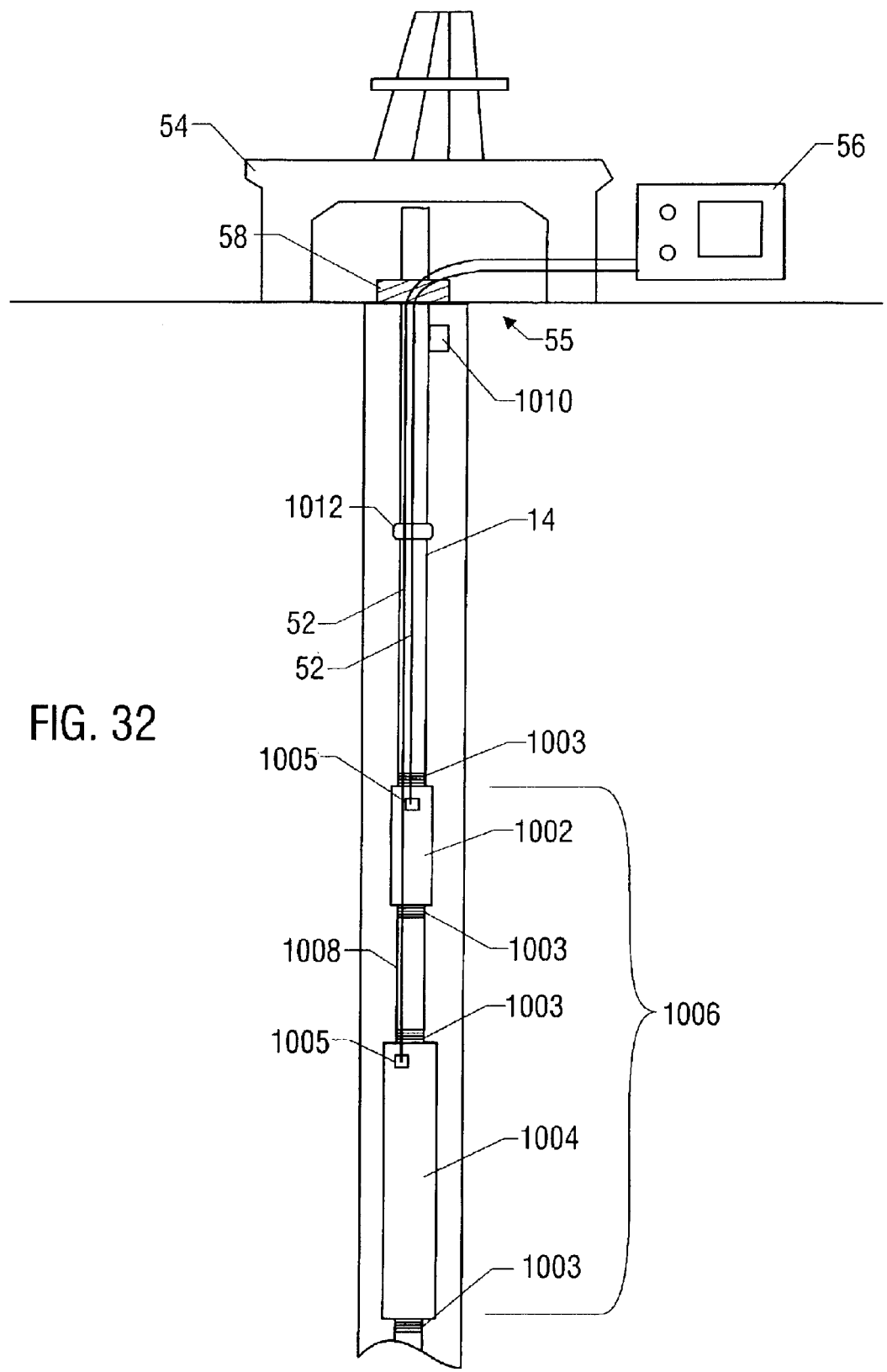
FIG. 32 is a representation of a single zone multiphase flow system in accordance with the present invention.

FIG. 32 illustrates a single zone application of a multiphase flow measurement system according to the present invention. A production pipe 14 extends from the reservoir to the platform 54. A flow meter 1006 is connected to the production pipe 14 approximately 100 meters or further from the wellhead 55. As one skilled in the art will realize, the depth at which gas comes out of solution largely determines this distance, although this distance can vary depending on the application. As an illustrative example and a rough guideline and depending on flow parameters, typical hydrocarbon and water mixtures remain in the bubbly flow regime at approximately 15% to 30% gas fraction for mixture flow rates>5 ft/sec in nearly vertical flows and at pressures of greater than approximately 3000 psi. For gas fractions above this level, bubbles tend to coalesce and the flow transitions to a slugging flow. From a multiphase flow measurement perspective, nearly homogenous flows, such as liquid or bubbly, are more straightforward to measure. The non-homogeneous flows such as the slugging, churning, and annular flow are more challenging.

The flow meter 1006 consists of two subassemblies, a pressure assembly 1002 and a flow assembly 1004 separated by a short length of pipe called a pup joint 1008. Each assembly has separate fiber optic cables 52 for sending and receiving light to interrogate sensors within the subassemblies. The pup joint 1008 measures about 5 to 10 feet in length. It is desired to design the pup joint as short as possible so that the axial location of the pressure assembly 1002 and the flow assembly 1004 is effectively the same for measurement purposes, which is particularly true when one considers that production pipes can reach depths of thousands of feet.

The pressure assembly 1002 and the flow assembly 1004 each have standard premium thread connectors 1003 to attach to a standard pipe 14 such as 3.5 inch diameter production tubing. The pressure assembly 1002 is about 5 feet in length and contains a 15,000-psi pressure and temperature transducer, such as the sensor apparatus disclosed in U.S. Pat. No. 6,016,702, entitled "High Sensitivity Fiber Optic Pressure Sensors For Use In Harsh Environments," which is incorporated by reference in its entirety. The flow assembly 1004 measures about 12 feet in length and contains a fiber optic velocity and a sound speed sensor, such as those described above in detail. The diameter of each assembly typically measures 5.60 inches because a protective housing surrounds the sensors, as is known.

As shown in FIG. 32, a sensor 1010 located below the choke valve 58 measures wellhead pressure and/or temperature. As one skilled in the art would realize, the sensor 1010 may be located on either side or on both sides of the choke valve 58. Furthermore, the sensor 1010 may comprise an electrical strain gauge or an optical fiber sensor. For the model 16 to determine phase flow rates, the sensor 1010 is located at a spatially removed location from the flow meter 1006. Locating the sensor 1010 in a vertically removed location from the flow meter 1006 insures that the pressure gradient between the sensor 1010 and the pressure assembly 1002 varies sufficiently in order to calculate a difference in pressure., If the difference in these pressures is negligible, the model may not accurately predict phase flow rates.

The data from the pressure assembly 1002 and the flow assembly 1004 travels through each fiber optic cable 52 from its respective connector region 1005 to the instrumentation unit 56. Standard clamps 1012, such as LaSalle clamps, secure the cable 52 to the pipe 14. The clamp 1012 may further secure other cable lines such as methanol injection lines and/or a subsurface safety valve lines, or other lines as is known in the art. As is well known, the fiber optic cable 52 may include a protection sheath that surrounds and protects the raw optical fiber within it.

The instrumentation unit 56, as is well known, preferably consists of an optical light source, an opto-electronic interrogation unit, a signal demodulation unit, a microprocessor, monitor, keyboard, associated power supplies, disk drives, data communication interfaces, the multiphase flow model 16 software and other necessary items. Any type of a multiphase flow model may be used including, but not limited to, flow model software manufactured by ABB Ltd. of Zurich, Switzerland, or Idun software systems from FMC Kongsberg SubSea of Houston, Tex./Kongsberg, Norway.

Figure 33:
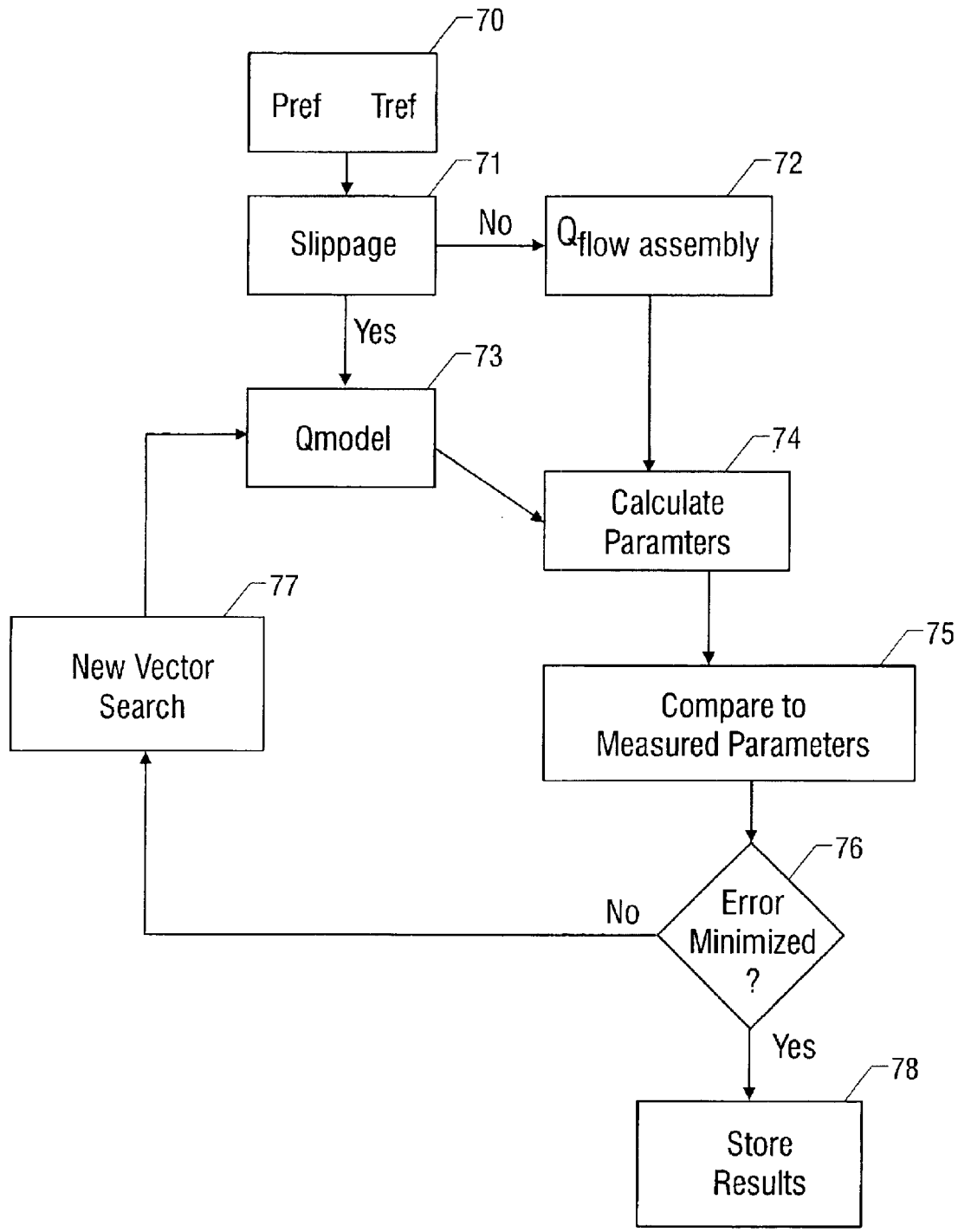
FIG. 33 is a block diagram of a multiphase flow model in accordance with the present invention.

When the instrumentation unit 56 receives the data, the model 16 predicts the phase flow rates in the basic manner depicted by FIG. 33. The flow model 16 preferably begins at step 70 where the fluid is defined thermodynamically, such as with a pressure measurement $P_{ref}$ and/or a temperature measurement $T_{ref}$. However in place of measuring these parameters, they may instead be estimated and entered into the model 16. In the embodiment shown in FIG. 32, the pressure assembly 1002 provides $P_{ref}$ and $T_{ref}$ to the instrumentation unit 56. The next step 71 then makes a determination of "slippage" in the fluid. If a fluid has minimal slippage or no slippage, all phases within the fluid are flowing at basically the same rate and the initial estimation of individual phase flow rates is considerably less complicated. Fluid with minimal slippage typically has a high flow rate and occurs in a vertically inclined pipe, which is a typical scenario in an oil/gas well. The predicted phase flow rates for a minimal slippage fluid may be calculated from the following:

$$Q_i = \phi_i A v_{meas} \qquad \text{Eq. 20}$$

where subscript i represents the phase evaluated, Q is the predicted phase flow rate, $\phi$ is the phase fraction of the i phase of the fluid from the speed of sound sensor, as described in detail above, A is the cross-sectional area of the pipe 14 and v is the measured velocity of the fluid mixture from the velocity sensor, as described in detail above. As one of skill in the art would know, if the fluid has three or more flowing phases, the phase fractions $\phi$ of the fluid mixture possibly cannot be directly determined from the speed of sound sensor, and instead the model makes an iterative determination of the phase fractions. By knowing the phase fractions, area of the pipe and velocity of the fluid mixture, the phase flow rates for a fluid mixture with minimal slippage is initially determined in step 72.

If the fluid exhibits a slippage condition, then the model will estimate (as opposed to calculate) the initial phase flow rates in step 73. This estimation varies between models, but generally, the basic information of the fluid, pipe geometry, the path fluid travels, constrictions within the pipe, and other factors known in the art are evaluated. As one skilled in the art would realize, the results of a good multiphase flow model do not depend on the accuracy of the predicted phase flow rates. Instead, by the error minimization process described below any predicted flow rate should eventually lead to the true flow rate after several iterations through the error function (Eq. 22 below).

After the initial determination of phase flow rates, the model 16 can calculate, in step 74, any flow-related parameter as long as the proper transfer function is known. The transfer function is the basic mathematical calculations for calculating a parameter, such as sound speed, from the estimated phase flow rates using well understood principles of fluid dynamics (SOS=f|$Q_o$, $Q_g$, $Q_w$|). These calculated parameters are then compared to the actual measured parameters, e.g., the fluid mixture sound speed from the speed of sound meter in the flow assembly 1004. The model 16 requires at a minimum one measurement for every phase flowing in the fluid 12 in addition to the preferable starting point measurements, i.e. $P_{ref}$ and $T_{ref}$. Thus a two-phase oil/water fluid would require two additional measurements as well as the $P_{ref}$ and/or $T_{ref}$, and likewise an oil/water/gas fluid requires three additional measurements as well as the $P_{ref}$ and/or $T_{ref}$. The additional measurements include fluid sound speed and at a minimum, either pressure, temperature, velocity or an additional fluid sound speed.

As stated previously, it is already known in the art to utilize parameters such as pressure, temperature, and velocity with a multiphase flow model to determine phase flow rates. However, the present invention incorporates the parameter of fluid sound speed into the model 16. This significantly increases the accuracy of the model 16, as will be shown below. Accordingly in step 74 sound speed is calculated through known transfer functions, as previously noted, another one or two parameters (depending on the number of phases) such as pressure, temperature and/or velocity is likewise calculated. These calculated parameters are then compared to the corresponding measured parameters as indicated by step 75. For the embodiment depicted in FIG. 32, the corresponding measurement parameters would include fluid sound speed and velocity from the flow assembly 1004 and wellhead pressure and/or temperature from sensor 1010. The comparison is then evaluated through an error function in step 76 (Eq. 22) which will be described in more detail below.

A simplified example may help illustrate the basic method behind multiphase flow models. One will realize that the pressure of a fluid within a vertical pipe decreases as one measures from the bottom of the well to the well head 55. The model, starting from the $P_{ref}$ starting point, essentially calculates the pressure drop at successive, rising intervals along the pipe 14 in accordance with the following equation:

$$Q = kA\left(\frac{P_1 - P_2}{\rho}\right)^{0.5} \quad \text{Eq. 21}$$

where Q is the estimated flow rate of the mixture, A is the cross sectional area of the pipe, ρ is the density of the fluid mixture which can be measured or estimated by known methods, k is a known discharge coefficient, and $P_1$ is the pressure at the starting point, which initially is equal to Pref. The model calculates a $P_2$ at successive intervals until it estimates a pressure drop calculation at the well head 55, $P_{wh}$. The model then compares this estimated $P_{wh}$ with the actual $P_{wh}$ measurement from the pressure sensor 1010. The amount of error between the two results is analyzed by the error function (Eq. 22). The result then leads the model to choose corresponding phase flow rates (step 77) and the process begins again. The process will repeat itself until the error is within acceptable limits and the results are then taken as the true phase flow rates and stored in step 78.

As shown above, Eq. 21 estimates the mixture flow rate $Q_w$, not the individual flow rates, thus one may wonder as to how this equation may help in determining the individual flow rates. What Eq. 21 does provide, however, is an additional constraint to the model, which enables the model to determine the individual component flow rates. It, by itself, would not be sufficient to determine component flow rates, but, in conjunction with the other constraints, such as measured mixture sound speed, it adds yet another constraint into the optimization process and improves the ability of the overall optimization of determining component flow rates.

The process described above, although illustrative, is a simplistic example of how the model determines phase flow rates. Depending on the multiphase flow model chosen the process may further take into consideration certain parameters to accurately depict the well conditions. Parameters that many models include are well geometry (horizontal, vertical or angled sections), the true vertical depth, ambient temperature along the fluid path, heat properties for the well formation, phase densities, viscosity and surface tension, pipe wall friction and the gas-oil ratio at equilibrium. These physical parameters are incorporated into the transfer functions to make the parameter calculations.

As mentioned several times above, the multiphase model couples to an error function to continually narrow the initial estimated phase flow rates to arrive at the correct solution. What has been discovered is that by incorporating fluid sound speed into this standard error function the accuracy of the predicted phase flow rates significantly improves. The standard error function is formulated as:

$$\text{Error} = \sum W_j \left[\frac{(X_{m,j} - X_{c,j})}{X_{m,j}}\right]^2 \quad \text{Eq. 22}$$

where j represents the parameter at issue (e.g. sound speed), W is a user defined weight factor for that parameter, and $X_m$ and $X_c$ are the measured and corresponding calculated parameters respectively. By virtue of the summation, this single equation incorporates all of the error terms of all parameters of interest, including fluid sound speed. If the results fall within a designated error range, for example 5%, then the phase flow rates reflect the true phase flow rates of the components in the fluid mixture. However, if the error exceeds the error range then the model 16 performs a new vector search as indicated by step 77 and the process begins again.

The improvement in the performance of the optimization procedure resulting from the incorporation of sound speed measurement is a result of the direct physical link between mixture sound speed and flow composition (equations 16 and 17). This constraint penalizes solutions that may satisfy other constraints, but does not constitute physically-accurate solutions. For example, given a pressure change from one location in a well to another, and assuming this to be the only measurement information available, a multiphase flow solution might be unable to determine whether the pressure drop resulted from a dense fluid moving slowly, or a light fluid flowing quickly, resulting in what is often referred to as "multiple, equi-probable solutions." In other words, the measurements are not sufficient to uniquely determine composition and flow rate. However, using a sound speed measurement in conjunction with a pressure differential constrains the optimization such that only one, unique solution minimizes the optimization. Constraining the sound speed of the mixture thus, in effect, predominately determines the density, allowing the pressure measurement to predominately determine the mixture flow rate.

In a numerical study performed of a three-phase fluid (oil/gas/water) comparing a prior art system using pressure and temperature measurements with the invention incorporating sound speed measurements, the study demonstrated the significant improvement in predicting phase flow rates when sound speed calculations are used. The prior art pressure/temperature system consisted of a pressure/temperature measurement downhole with a pressure/temperature measurement both below and above the choke valve 58. The speed of sound system corresponded to the embodiment shown in FIG. 32 with a speed of sound, velocity, pressure and temperature measurement downhole and a pressure measurement below the choke valve 58.

Figure 34:
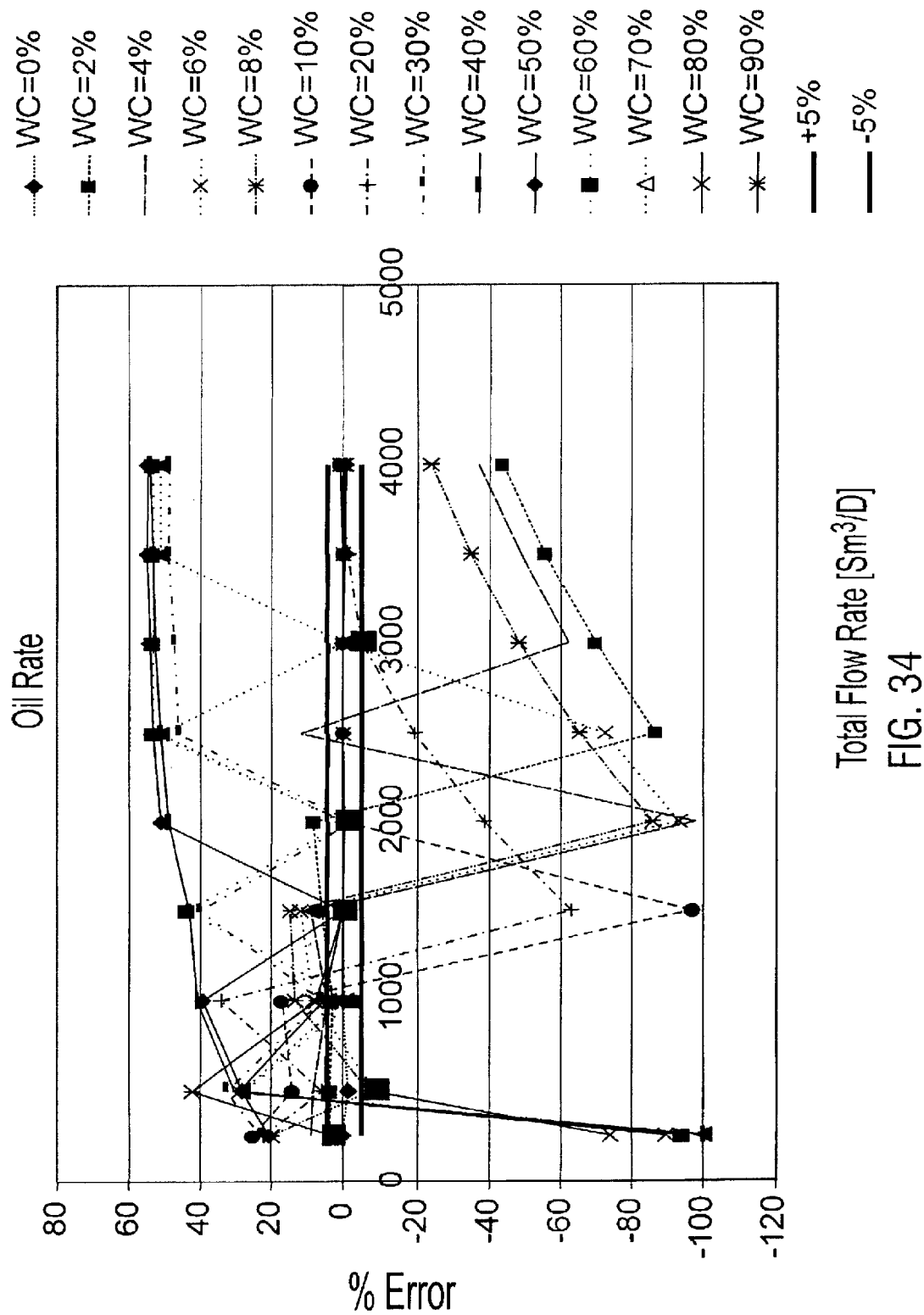
FIG. 34 is a graph representing a numerical test of a multiphase flow model incorporating pressure and temperature measurements to determine Oil Rate.
Figure 35:
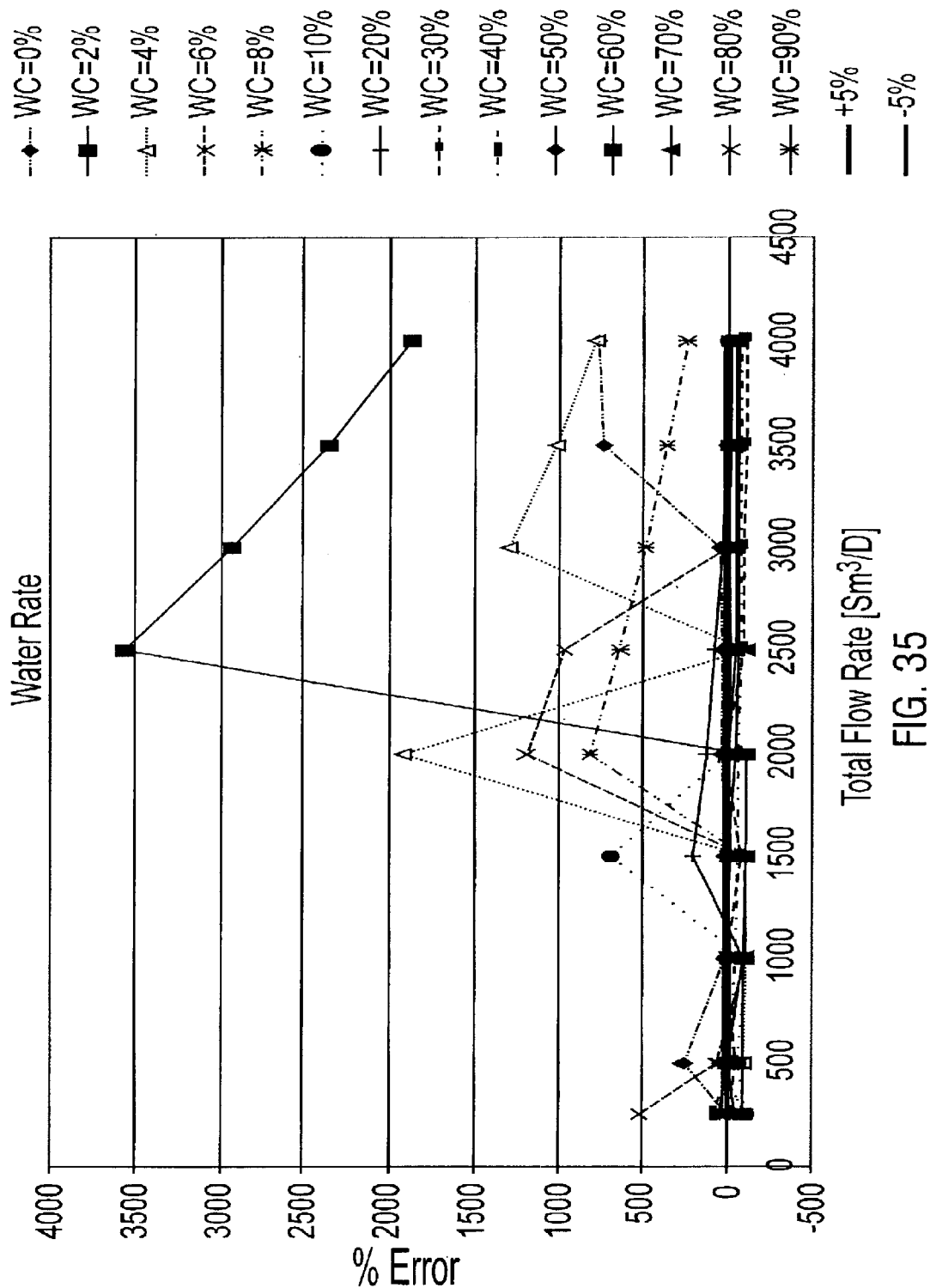
FIG. 35 is a graph representing a numerical test of a multiphase flow model incorporating pressure and temperature measurements to determine Water Rate.

As demonstrated by FIGS. 34 and 35, the model 16 for the pressure/temperature system was not able to reproduce the correct phase flow rates within a desired +/−5% error range. Both FIGS. 34 and 35 represent a fluid with a gas/oil ratio (GOR) of 200 with FIG. 34 representing oil rate ($Q_o$) and FIG. 35 representing water rate ($Q_w$). The error range of +/−5% is depicted in the graph as two horizontal lines. The total liquid flow rate extends along the x-axis with units of $Sm^3/D$, which is standard meters$^3$ per day. One may realize that the graphs show total liquid flow as opposed to the individual phase flow rates. This is preferred because the velocity sensor directly measures the total liquid flow measurement, while the model indirectly measures the individual phase flow rates. By graphing the total flow rate, the graphs become easily comparable to each other and the data is plotted by a direct measurement instead of a one step removed, indirect measurement. Furthermore, one of skill in the art will realize that if the total flow rate at a given point is multiplied with the point's representative phase fraction percent (100%-wc %), the desired individual phase flow rate ($Q_o$, $Q_w$, $Q_g$) can be determined (taking into consideration the error percentage).

In FIGS. 34 and 35, many points fall outside of the 5% error range. In FIG. 34 several data points fall outside of the 50% and even 100% error range, clearly indicating how poorly the model predicts oil flow rates with pressure and temperature measurements alone. Turning to FIG. 35, the data significantly erodes with error percentages approaching 3500%. Furthermore, high watercuts such as 60% and 80% have some of the highest errors. As one of skill in the art may realize these watercuts should instead have the greatest accuracy, as will be discussed below.

Figure 36:
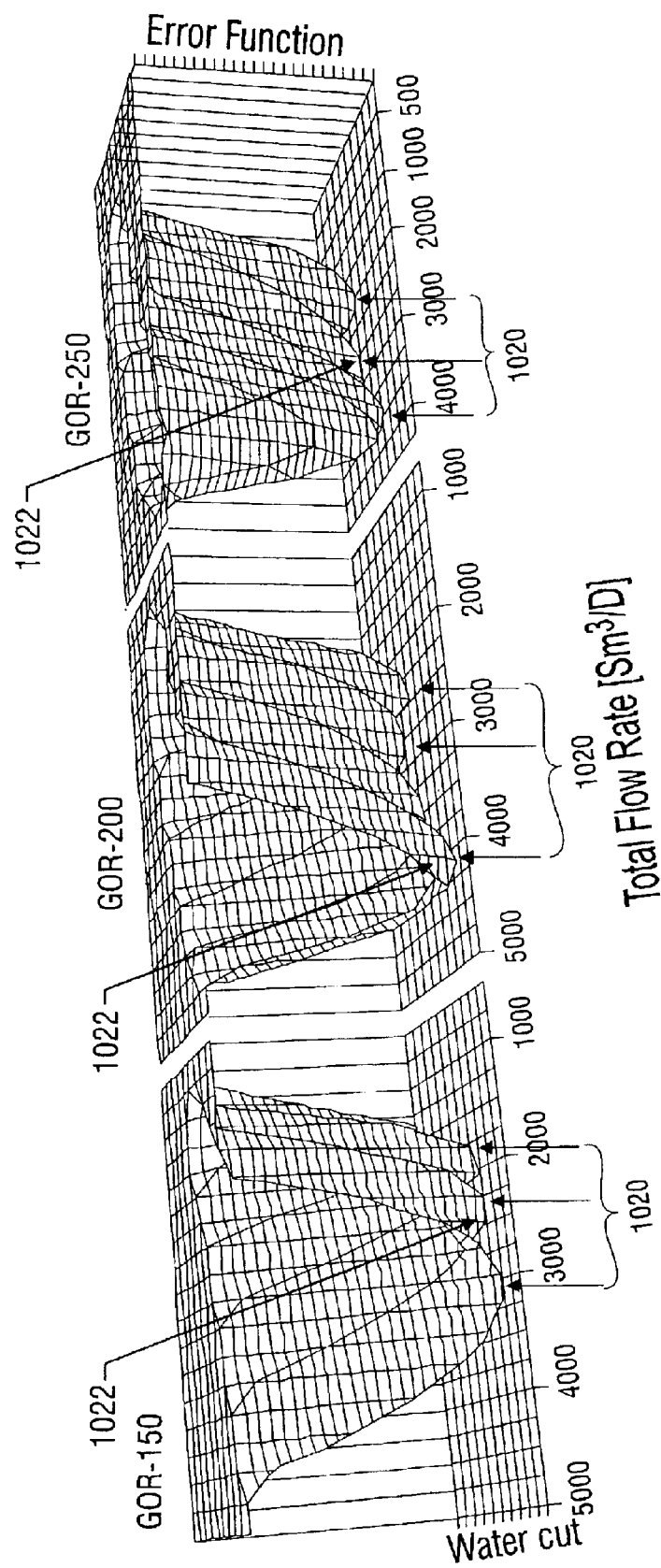
FIG. 36 is a graph of the error function created for a multiphase flow model incorporating pressure and temperature measurements to determine phase flow rates.

Turning to FIG. 36, establishing the value of the error function (from Eq. 22) based on one single pass through the search routine generated the data for FIG. 36. The error function is graphed for three GORs (150, 200, and 250). Again the total liquid flow rate is on the x-axis, watercut is on the y-axis and the error function is on the z-axis. As one will notice, the figure demonstrates that for a model incorporating temperature and pressure measurements alone, multiple local minima 1020 appear for any set of parameters. For example with a GOR of 200, at least four local minima appear, effectively masking the true solution minimum 1022, which is shown at 4000 $Sm^3/D$ for a GOR of 200. These local minima 1020 can mislead one to believe that the true minimum 1022 lies within reach, when in fact a local minimum is leading to the wrong result.

Figure 37:
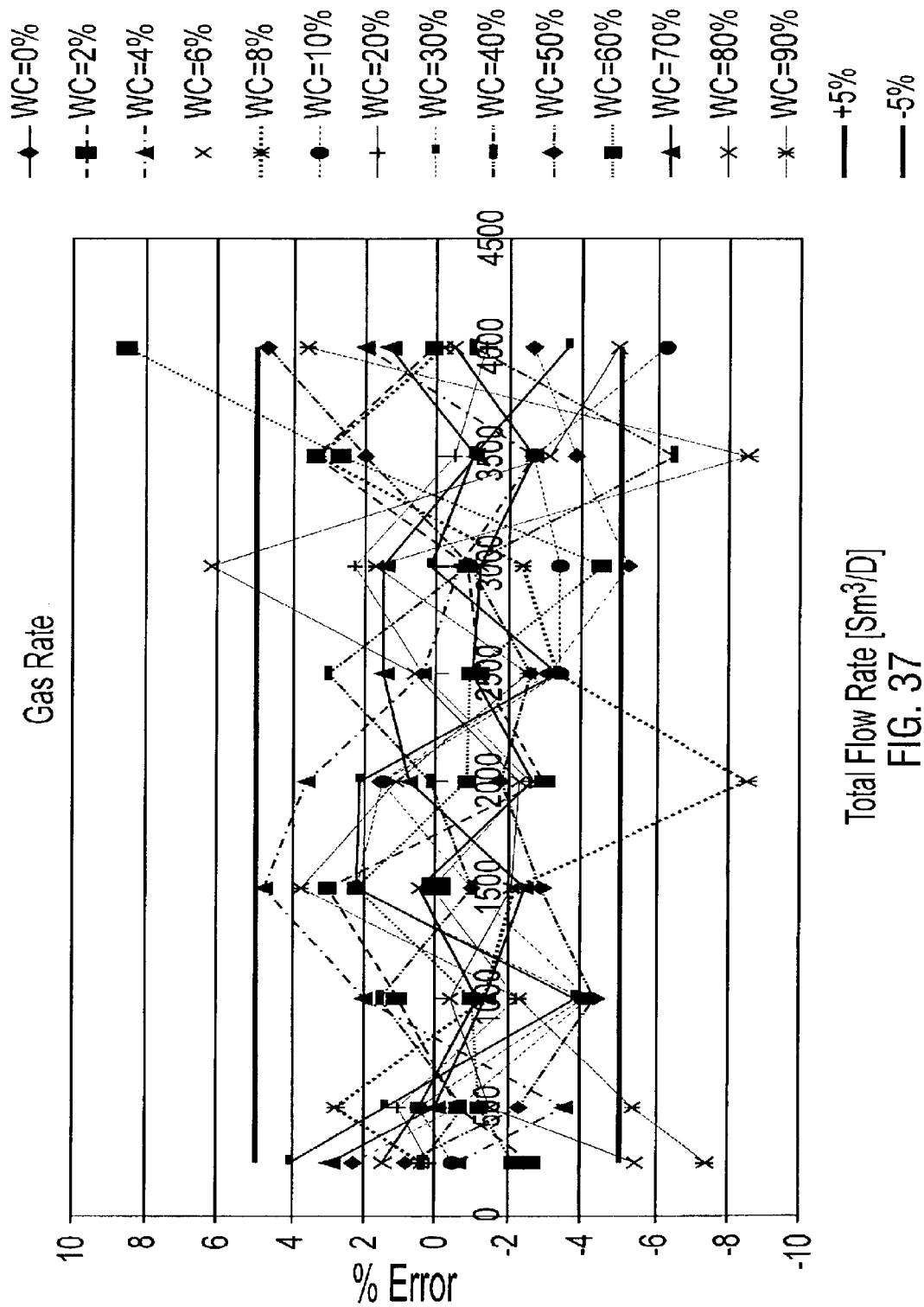
FIG. 37 is a graph representing a numerical test of a multiphase flow model incorporating sound speed, velocity and pressure measurements to determine Gas Rate.
Figure 38:
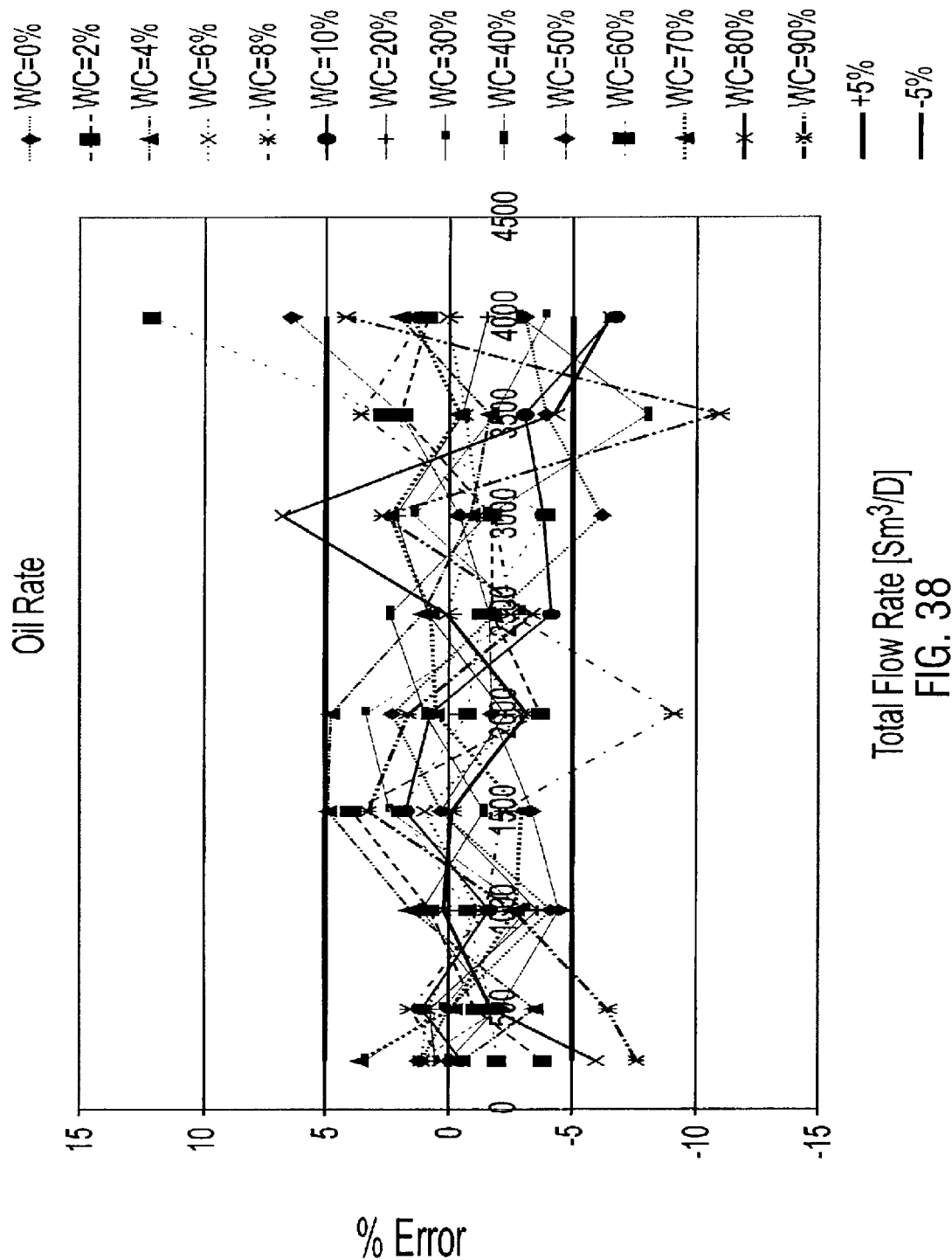
FIG. 38 is a graph representing a numerical test of a multiphase flow model incorporating sound speed, velocity and pressure measurements to determine Oil Rate.
Figure 39:
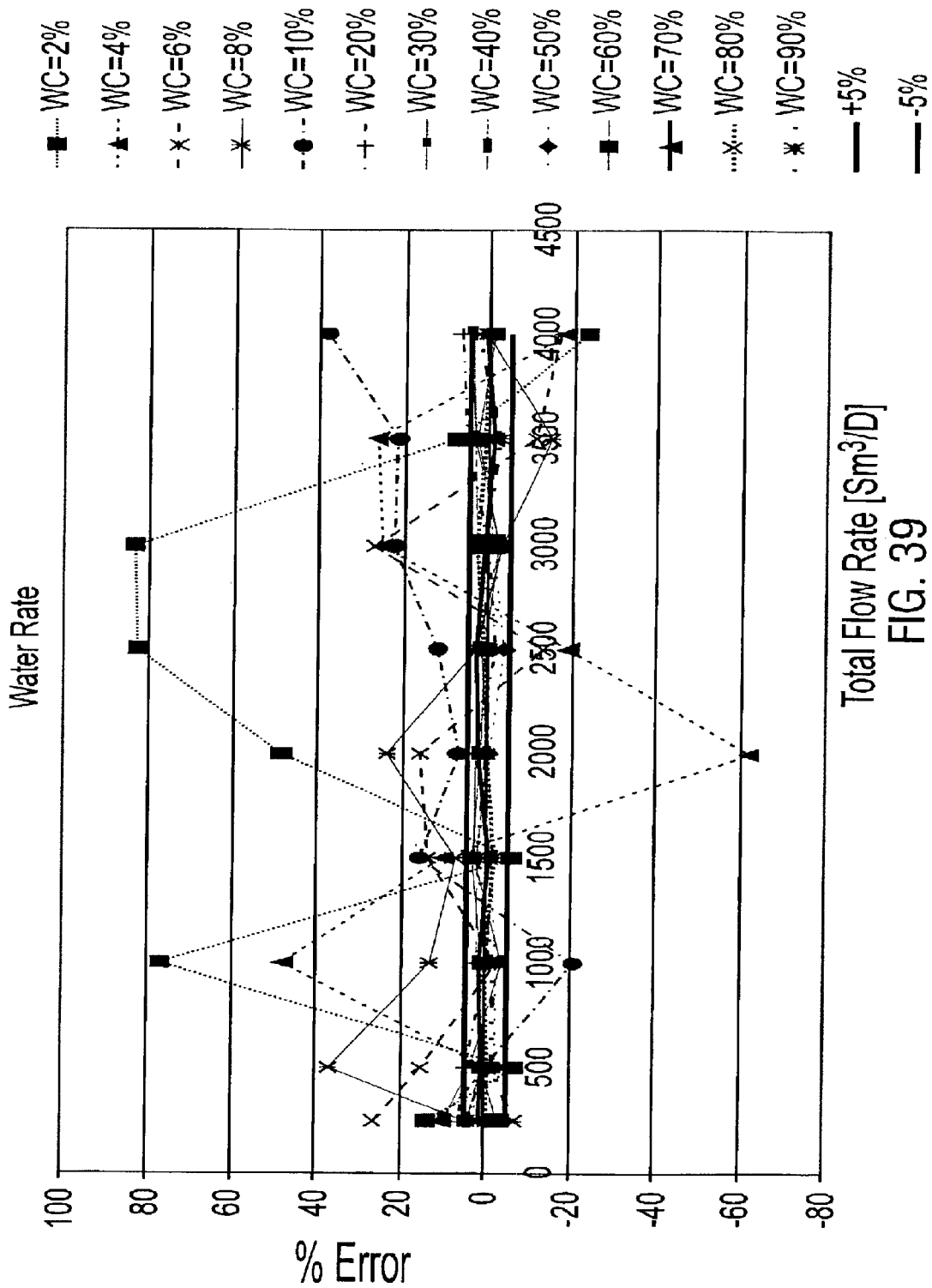
FIG. 39 is a graph representing a numerical test of a multiphase flow model incorporating sound speed, velocity and pressure measurements to determine Water Rate.

However, applying speed of sound to the model 16 displayed significantly better results. FIGS. 37–39 depict a fluid with a GOR of 200. Again two bold lines depict the +/−5% error range and for FIG. 37 (Gas Rate) and FIG. 38 (Oil Rate) nearly every point representing a specific watercut percentage falls within the acceptable range of error. The graphs therefore demonstrate the beneficial effect of incorporating speed of sound with velocity and pressure into a multiphase flow model.

One will notice that with regard to FIG. 39, Water Rate points representing small percentages of watercut have larger deviations from the correct value. These larger deviations (which are still significantly below the error of 2000–3500% in FIG. 35) however only appear in watercut percentages of less than 10%. As one skilled in the art would realize, this is of little consequence. When dealing with error percentages, very small flow rates will exhibit magnified errors and thus acceptance criteria based on relative error alone, as shown in FIG. 39, leads to exaggerated deviations. Instead, acceptance criteria should be formulated as a combination of relative and absolute values, and when the data of FIG. 39 is subjected to that criterion, the results fall within the standard range of error. A simplified example, though, may be helpful. If an oil/water fluid has a total flow rate of 1000 barrels/day and phase fractions of 96% oil and 4% water and a margin of error of +/−5%, the oil flows at about 960 barrels/day with an error range of 50 barrels (910 to 1010 barrels/day). However, the water would be flowing at only 40 barrels/day (1000×0.04). The error of 50 barrels a day becomes quite significant, ranging from −10 to 90 barrels/day. Hence a relatively small error percentage becomes increasingly magnified with smaller flow rates. Thus when small flow rates are present, the acceptance criteria should be based on a combination of relative and absolute values as is known. And referring back to FIG. 35, incorporating only pressure and temperature measurements led to significant errors in watercuts with high percentages. This again demonstrates the improvement of incorporating sound speed into a multiphase flow model.

Figure 40:
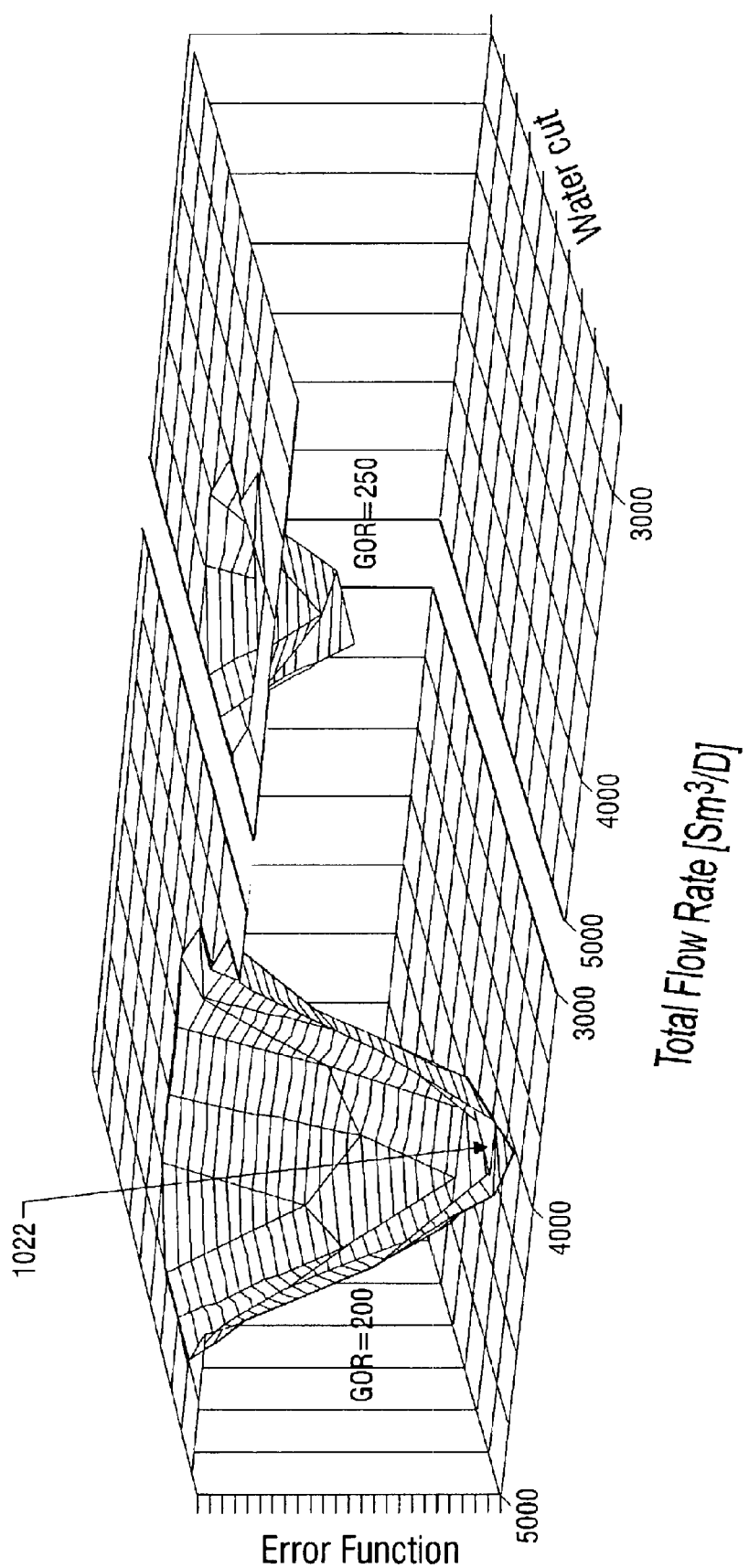
FIG. 40 is a graph of the error function created for a multiphase flow model incorporating sound speed, velocity and pressure measurements to determine phase flow rates.

Now turning to FIG. 40 one will notice that instead of many local minima, the graph indicates only a single true minimum 1022 for a GOR of 200, at approximately 4000 $Sm^3/D$. (The GOR error function for 150 is not shown as the surface dimensions were out of scale with respect to the z-axis.) Further, the steep slope of the error function quickly leads one to the correct result. FIG. 40 demonstrates again the improvement of models incorporating sound speed. Once the model has reached the true minimum, the model stores the results in step 78.

Figure 41:
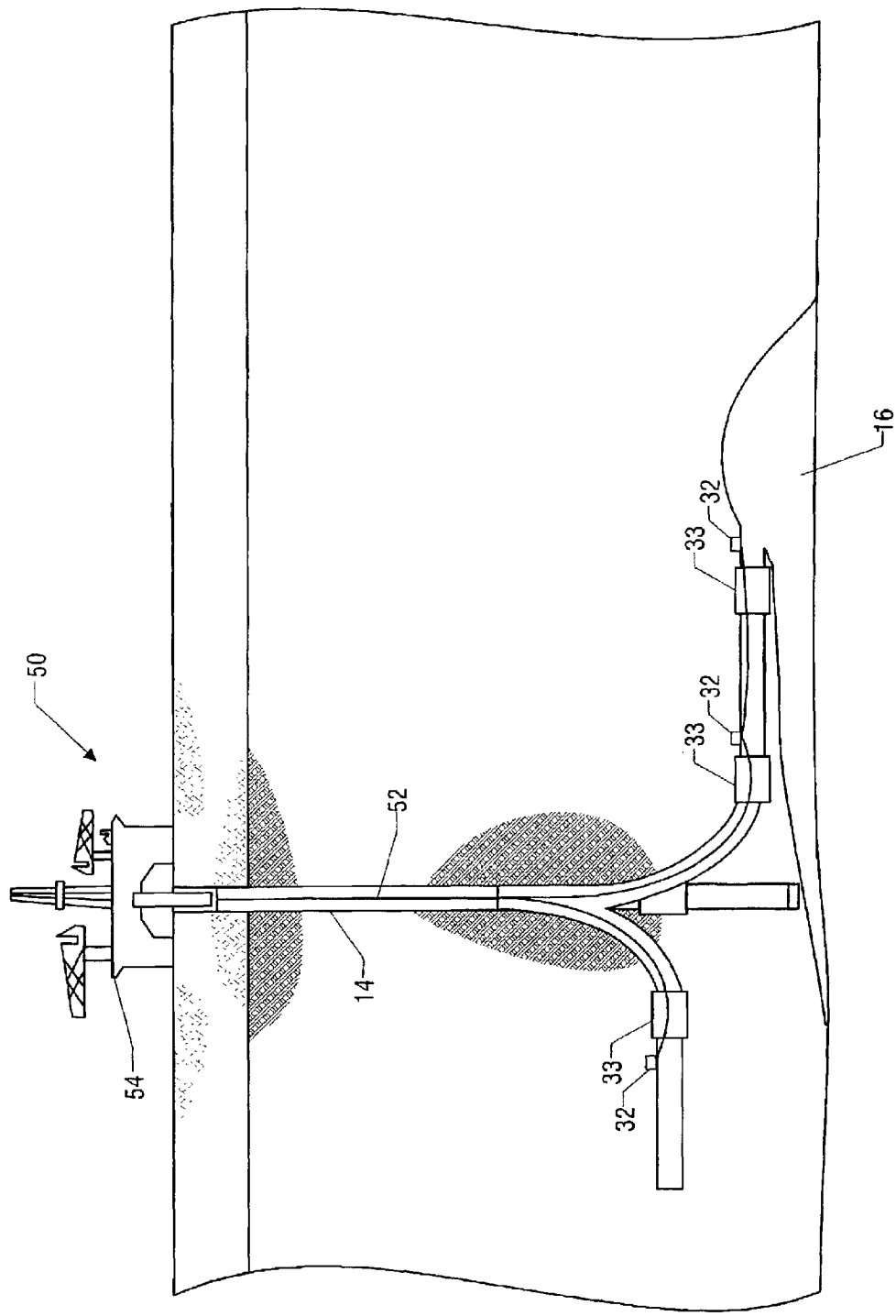
FIG. 41 is a graphical representation of a multizone multiphase flow system in accordance with the present invention.

Now referring to FIG. 41 there is shown a multizone, multiphase production system 50 having distributed temperature and pressure transducers 32 located at various axial positions along pipe 14. The system 50 further comprises multiple distributed sensor apparatuses 33 located at various axial positions along pipe 14 providing temperature, pressure, speed of sound and/or bulk velocity of the fluid at each location. This embodiment has taken FIG. 32 and distributed the basic configuration over many locations. This configuration is more complicated than that described above but derives benefits of combining distributed measurement systems with distributed sound speed and velocity measurements. Each sensor produces a signal communicated to the model 16 via cable 52 located at the platform 54 or a remote location. In the case of multi-zone distributed sensor systems, it is more difficult, and less meaningful, to attempt to isolate the role of each constraint in the overall optimization system. However, utilizing fully distributed sound speed, velocity, pressure and temperature measurements enables one to address systems of arbitrary complexity. In this optimization, all relationships linking the distributed measurements to the desired quantities can and should be exploited.

As stated previously, the sensors may comprise any type of sensor capable of measuring the unsteady (or ac or dynamic) pressures within a pipe, such as piezoelectric, optical, capacitive, resistive (e.g., Wheatstone bridge), accelerometers (or geophones), velocity measuring devices, displacement measuring devices, etc. If optical pressure sensors are used, the sensors may be Bragg grating based pressure sensors, such as that described in U.S. Pat. No. 6,016,702, entitled "High Sensitivity Fiber Optic Pressure Sensor For Use In Harsh Environments." Alternatively, the sensors may be electrical or optical strain gauges attached to or embedded in the outer or inner wall of the pipe and which measure pipe wall strain, including microphones, hydrophones, or any other sensor capable of measuring the unsteady pressures within the pipe. In an embodiment of the present invention that utilizes fiber optics as the pressure sensors the pressure sensors may be connected individually or may be multiplexed along one or more optical fibers using wavelength division multiplexing (WDM), time division multiplexing (TDM), or any other optical multiplexing techniques. Alternatively, a portion or all of the fiber between the gratings (or including the gratings, or the entire fiber, if desired) may be doped with a rare earth dopant (such as erbium) to create a tunable fiber laser, such as is described in U.S. Pat. No. 5,317,576, entitled "Continuously Tunable Single Mode Rare-Earth Doped Laser Arrangement," to Ball et al., or U.S. Pat. No. 5,513,913, entitled "Active Multipoint Fiber Laser Sensor," to Ball et al., or U.S. Pat. No. 5,564,832, entitled "Birefringent Active Fiber Laser Sensor," to Ball et al., all of which are incorporated herein by reference.

For any of the embodiments described, the pressure sensors, including electrical strain gauges, optical fibers and/or gratings among others as described, may be attached to the pipe by adhesive, glue, epoxy, tape or other suitable attachment means to ensure suitable contact between the sensor and the pipe. The sensors may alternatively be removable or permanently attached via known mechanical techniques such as by mechanical fastener, by a spring loaded arrangement, by clamping, by a clam shell arrangement, by strapping or by other equivalents. Alternatively, the strain gauges, including optical fibers and/or gratings, may be embedded in a composite pipe. If desired, for certain applications, the gratings may be detached from (or strain or acoustically isolated from) the pipe if desired.

The present invention allows the speed of sound to be determined in a pipe independent of pipe orientation, i.e., vertical, horizontal, or any other orientation. Also, the invention does not require any disruption to the flow within the pipe (e.g., an orifice or venturi). Further, the invention may use ac (or unsteady or dynamic) pressure measurements as opposed to static (dc) pressure measurements and is therefore less sensitive to static shifts (or errors) in sensing. Furthermore, if harsh environment fiber optic pressure sensors are used to obtain the pressure measurements, such sensors eliminate the need for any electronic components down-hole, thereby improving reliability of the measurement.

In the embodiments shown and discussed, some or all of the functions within the model 16 and/or Logic (140, 160, 740) may be implemented in software (using a microprocessor or computer) and/or firmware, or may be implemented using analog and/or digital hardware, having sufficient memory, interfaces, and capacity to perform the functions described.

It should be understood that any of the features, characteristics, alternatives or modifications described regarding a particular embodiment may also be applied, used, or incorporated with any other embodiment described.

Although the invention has been described and illustrated with respect to exemplary embodiments thereof, the foregoing and various other additions and omissions may be made therein and thereto without departing from the spirit and scope of the present invention.

What is claimed is:

1. A system for determining at least one flow rate of a phase of an N-phase fluid mixture flowing in a conduit, comprising:
    a speed of sound meter along the conduit for determining the speed of sound in the mixture, wherein the mixture includes at least two phases;
    at least N−1 additional sensors along the conduit for providing at least N−1 first parameters indicative of the mixture; and
    a computer containing a multiphase flow model which receives the speed of sound and the at least N−1 first parameters to compute a flow rate of one of the phases of the mixture.

2. The system of claim 1, wherein at least one of the additional sensors is spatially removed from the speed of sound meter.

3. The system of claim 2, wherein the at least one spatially removed sensor is located proximate to a well head.

4. The system of claim 3, wherein the spatially removed sensor is either a pressure or a temperature sensor.

5. The system of claim 3, wherein the spatially removed sensors comprise two sensors.

6. The system of claim 5, wherein the two sensors comprise a pressure sensor and a temperature sensor.

7. The system of claim 1, wherein at least one of the additional sensors is located proximate to the speed of sound meter.

8. The system of claim 7, wherein the additional sensor is selected from the group consisting of a velocity meter for measuring the velocity of the mixture, a pressure sensor for measuring the pressure of the mixture, and a temperature sensor for measuring the temperature of the mixture.

9. The system of claim 1 further comprising a reference sensor for measuring either a reference pressure or a reference temperature of the mixture in the proximity of the speed of sound meter.

10. The system of claim 9, wherein the reference sensor provides the reference pressure or reference temperature received by the computer and used as an initial input into the multiphase flow model.

11. The system of claim 1 further comprising a reference sensor system for measuring a reference pressure and temperature of the mixture in the proximity of the speed of sound meter.

12. The system of claim 11, wherein the reference sensor system provides the reference pressure and temperature received by the computer and used as an initial input into the multiphase flow model.

13. The system of claim 1, wherein the multiphase flow model comprises an iterative process.

14. The system of claim 1, wherein the multiphase flow model utilizes a search algorithm for computing the flow rate.

15. The system of claim 1, wherein the multiphase flow model utilizes a search algorithm for computing the flow rate by minimizing an error function indicative of the differences between measured parameters and calculated parameters.

16. The system of claim 15, wherein the measured parameters and calculated parameters are selected from the group consisting of a velocity, sound speed, pressure and temperature of the mixture.

17. The system of claim 1, wherein the speed of sound meter comprises a plurality of fiber optic pressure sensors.

18. The system of claim 17, wherein the plurality of pressure sensors comprise a series of wraps around the conduit.

19. The system of claim 18, wherein the wraps in the series are separated by Bragg gratings.

20. A system for determining at least one flow rate of a phase of a multiphase fluid mixture flowing in a conduit, comprising:
   a speed of sound meter along the conduit for determining a parameter indicative of the speed of sound in the mixture, wherein the mixture includes at least two phases;
   at least one first additional sensor along the conduit for providing at least one first parameter indicative of the mixture, wherein at least one of the first additional sensors is spatially removed from the speed of sound meter; and
   a computer containing a multiphase flow model which receives the speed of sound parameter and the at least one first parameter to compute a flow rate of one of the phases in the mixture.

21. The system of claim 20, wherein the at least one first spatially removed sensor is located proximate to a well head.

22. The system of claim 21, wherein the first spatially removed sensor is either a pressure or a temperature sensor.

23. The system of claim 21, wherein the first spatially removed sensors comprise two sensors.

24. The system of claim 23, wherein the two sensors comprise a pressure sensor and a temperature sensor.

25. The system of claim 21 further comprising at least one second additional sensor along the conduit for providing at least one second parameter indicative of the mixture and wherein the computer further receives the at least one second parameter to compute the flow rate of the phase in the mixture.

26. The system of claim 25, wherein the second additional sensor is located proximate to the speed of sound meter.

27. The system of claim 25, wherein the second additional sensor is selected from the group consisting of a velocity meter for measuring the velocity of the mixture, a pressure sensor for measuring the pressure of the mixture, and a temperature sensor for measuring the temperature of the mixture.

28. The system of claim 20 further comprising a reference sensor for measuring either a reference pressure or a reference temperature of the mixture in the proximity of the speed of sound meter.

29. The system of claim 28, wherein the reference sensor provides the reference pressure or reference temperature received by the computer and used as an initial input into the multiphase flow model.

30. The system of claim 20 further comprising a reference sensor system for measuring a reference pressure and a reference temperature of the mixture in the proximity of the speed of sound meter.

31. The system of claim 30, wherein the reference sensor system provides the reference pressure and temperature received by the computer and used as an initial input into the multiphase flow model.

32. The system of claim 20, wherein the multiphase flow model comprises an iterative process.

33. The system of claim 20, wherein the multiphase flow model utilizes a search algorithm for computing the flow rate.

34. The system of claim 20, wherein the multiphase flow model utilizes a search algorithm for computing the flow rate by minimizing an error function indicative of the differences between measured parameters and calculated parameters.

35. The system of claim 34, wherein the measured parameters and calculated parameters are selected from the group consisting of a velocity, sound speed, pressure and temperature of the mixture.

36. The system of claim 20, wherein the speed of sound meter comprises a plurality of fiber optic pressure sensors.

37. The System of claim 36, wherein the plurality of pressure sensors comprise a series of wraps around the conduit.

38. The system of claim 37, wherein the wraps in the series are separated by Bragg gratings.

39. A system for determining at least one flow rate of a phase of a multiphase fluid mixture flowing in a conduit, comprising:
   at a first axial location along the conduit,
      a velocity sensor for providing a parameter indicative of the velocity of the fluid;
      a sound speed sensor for providing a parameter indicative of the fluid sound speed in the fluid;
      a pressure sensor for providing a parameter indicative of the pressure of the fluid;
      a temperature sensor for providing a parameter indicative of the temperature of the fluid, wherein the fluid includes at least two phases;
   at a second axial location along the conduit different from the first axial location,
      at least one additional sensor for providing at least one further parameter indicative of the fluid; and
   a multiphase flow model for receiving the parameter indicative of the velocity, the parameter indicative of the fluid sound speed, the parameter indicative of the pressure, the parameter indicative of temperature, and the further parameter to compute a flow rate of one of the phases in the fluid.

40. The system of claim 39, wherein the additional sensor is located proximate to a well head.

41. The system of claim 40, wherein the additional sensor is either a pressure or a temperature sensor.

42. The system of claim 39, wherein the multiphase flow model comprises an iterative process.

43. The system of claim 39, wherein the multiphase flow model utilizes a search algorithm for computing the flow rate.

44. The system of claim 39, wherein the multiphase flow model utilizes a search algorithm for computing the flow rate by minimizing an error function indicative of the differences between measured parameters and calculated parameters.

45. The system of claim 44, wherein the measured parameters and calculated parameters are selected from the group consisting of a velocity, sound speed, pressure and temperature of the mixture.

46. The system of claim 39, wherein at least one of the velocity sensor, the sound speed sensor, the pressure sensor or the temperature sensor comprise a fiber optic sensor.

47. The system of claim 46, wherein at least one of the fiber optic sensors utilize a Bragg grating.

48. A method for determining at least one flow rate of a phase of a multiphase fluid mixture flowing in a conduit using a computer containing a multiphase flow model, comprising:
   receiving a speed of sound signal indicative of the speed of sound in the mixture into the multiphase flow model, wherein the mixture includes at least two phases;
   receiving at least one first additional signal indicative of the mixture into the multiphase flow model; and
   processing the speed of sound signal and the at least one first additional signal to compute a flow rate of one of the phases in the mixture.

49. The method of claim 48, wherein the processing step comprises an iterative process.

50. The method of claim 48, wherein the processing step utilizes a search algorithm for computing the flow rate.

51. The method of claim 48, wherein the processing step utilizes a search algorithm for computing the flow rate by minimizing an error function.

52. A method for determining at least one flow rate of a phase of an N-phase fluid mixture flowing in a conduit using a computer containing a multiphase flow model, comprising:
receiving a speed of sound signal indicative of the speed of sound in the mixture into the multiphase flow model using a speed of sound meter along the conduit, wherein the mixture includes at least two phases;
receiving at least N−1 signals indicative of the mixture into the multiphase flow model using at least N−1 additional sensors along the conduit; and
processing the speed of sound signal and the at least N−1 signals to compute a flow rate of one of the phases in the mixture.

53. The method of claim 52, wherein at least one of the additional sensors is spatially removed from the speed of sound meter.

54. The method of claim 53, wherein the at least one spatially removed sensor is located proximate to a well head.

55. The method of claim 54, wherein the spatially removed sensor is either a pressure or a temperature sensor.

56. The method of claim 54, wherein the spatially removed sensors comprise two sensors.

57. The method of claim 56, wherein the two sensors comprise a pressure sensor and a temperature sensor.

58. The method of claim 52, wherein at least one of the additional sensors is located proximate to the speed of sound meter.

59. The method of claim 58, wherein the additional sensor is selected from the group consisting of a velocity meter for measuring the velocity of the mixture, a pressure sensor for measuring the pressure of the mixture, and a temperature sensor for measuring the temperature of the mixture.

60. The method of claim 52 further comprising receiving a reference signal indicative of the pressure in the mixture or the temperature in the mixture into the multiphase flow model using a reference sensor along the conduit in the proximity of the speed of sound meter.

61. The method of claim 60, wherein the reference signal is used as an initial input into the multiphase flow model.

62. The method of claim 52 further comprising receiving a reference signal indicative of the pressure in the mixture and a reference signal indicative of the temperature in the mixture into the multiphase flow model using a reference sensor system along the conduit in the proximity of the speed of sound meter.

63. The method of claim 62, wherein the reference signals are used as an initial input into the multiphase flow model.

64. The method of claim 52, wherein the processing step comprises an iterative process.

65. The method of claim 52, wherein the processing step utilizes a search algorithm for computing the flow rate.

66. The method of claim 52, wherein the processing step utilizes a search algorithm for computing the flow rate by minimizing an error function.

67. The method of claim 52, wherein the speed of sound meter comprises a plurality of fiber optic pressure sensors.

68. The method of claim 67, wherein the plurality of pressure sensors comprise a series of wraps around the conduit.

69. The method of claim 68, wherein the wraps in the series are separated by Bragg gratings.

70. A method for determining at least one flow rate of a phase of a multiphase fluid mixture flowing in a conduit, comprising:
placing a speed of sound meter along the conduit for determining a parameter indicative or the speed of sound in the mixture, wherein the mixture includes at least two phases;
placing at least one first additional sensor along the conduit for providing at least one first parameter indicative of the mixture, wherein at least one of the first additional sensors is spatially removed from the speed of sound meter; and
sending the speed of sound parameter and the at least one first parameter to a computer containing a multiphase flow model and computing a flow rate of one of the phases in the mixture.

71. The method of claim 70, wherein the at least one first spatially removed sensor is located proximate to a well head.

72. The method of claim 71, wherein the first spatially removed sensor is either a pressure or temperature sensor.

73. The method of claim 71, wherein the first spatially removed sensors comprise two sensors.

74. The method of claim 73, wherein the two sensors comprise a pressure sensor and a temperature sensor.

75. The method of claim 71 further comprising placing at least one second additional sensor along the conduit for providing at least one second parameter indicative of the mixture and sending the at least one second parameter to the computer and computing the flow rate of the phase in the mixture.

76. The method of claim 75, wherein the second additional sensor is located proximate to the speed of sound meter.

77. The method of claim 75, wherein the second additional sensor is selected from the group consisting of a velocity meter for measuring the velocity of the mixture, a pressure sensor for measuring the pressure of the mixture, and a temperature sensor for measuring the temperature of the mixture.

78. The method of claim 70 further comprising placing a reference sensor for measuring either a reference pressure or a reference temperature of the mixture in the proximity of the speed of sound meter.

79. The method of claim 78, wherein the reference sensor provides the reference pressure or reference temperature received by the computer and used as an initial input into the multiphase flow model.

80. The method of claim 70 further comprising placing a reference sensor system for measuring a reference pressure and a reference temperature of the mixture in the proximity of the speed of sound meter.

81. The method of claim 80, wherein the reference sensor system provides the reference pressure and temperature received by the computer and used as an initial input into the multiphase flow model.

82. The method of claim 70, wherein the multiphase flow model comprises an iterative process.

83. The method of claim 70, wherein the multiphase flow model utilizes a search algorithm for computing the flow rate.

84. The method of claim 70, wherein the multiphase flow model utilizes a search algorithm for computing the flow rate by minimizing an error function.

85. The method of claim 70, wherein the speed of sound meter comprises a plurality of fiber optic pressure sensors.

86. The method of claim 85, wherein the plurality of pressure sensors comprise a series of wraps around the conduit.

87. The method of claim 86, wherein the wraps in the series are separated by Bragg gratings.

* * * * *

UNITED STATES PATENT AND TRADEMARK OFFICE
CERTIFICATE OF CORRECTION

PATENT NO.    : 6,813,962 B2
DATED         : November 9, 2004
INVENTOR(S)   : Daniel L. Gysling et al.

It is certified that error appears in the above-identified patent and that said Letters Patent is hereby corrected as shown below:

<u>Column 30,</u>
Line 33, please delete "measunng" and insert -- measuring --.

<u>Column 32,</u>
Line 5, please delete "System" and insert -- system --.

Signed and Sealed this

Second Day of August, 2005

JON W. DUDAS
*Director of the United States Patent and Trademark Office*